United States Patent
Lee et al.

(10) Patent No.: US 10,284,876 B2
(45) Date of Patent: May 7, 2019

(54) INTRA SCENE PREDICTION METHOD OF DEPTH IMAGE FOR INTERLAYER VIDEO DECODING AND ENCODING APPARATUS AND METHOD

(71) Applicants: SAMSUNG ELECTRONICS CO., LTD., Suwon-si (KR); KWANGWOON UNIVERSITY INDUSTRY-ACADEMIC COLLABORATION FOUNDATION, Seoul (KR)

(72) Inventors: Jin-young Lee, Hwaseong-si (KR); Dong-gyu Sim, Seoul (KR); Woong Lim, Yangju-si (KR); Hyun-ho Jo, Seoul (KR); Byeong-doo Choi, Suwon-si (KR); Min-woo Park, Hwaseong-si (KR); Yong-jin Cho, Seoul (KR)

(73) Assignees: SAMSUNG ELECTRONICS CO., LTD, Suwon-si (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 163 days.

(21) Appl. No.: 14/906,021

(22) PCT Filed: Jul. 18, 2014

(86) PCT No.: PCT/KR2014/006569
§ 371 (c)(1),
(2) Date: Jan. 19, 2016

(87) PCT Pub. No.: WO2015/009113
PCT Pub. Date: Jan. 22, 2015

(65) Prior Publication Data
US 2016/0156932 A1  Jun. 2, 2016

Related U.S. Application Data

(60) Provisional application No. 61/847,758, filed on Jul. 18, 2013.

(51) Int. Cl.
*H04N 19/597* (2014.01)
*H04N 19/59* (2014.01)
(Continued)

(52) U.S. Cl.
CPC ......... *H04N 19/597* (2014.11); *H04N 19/107* (2014.11); *H04N 19/11* (2014.11);
(Continued)

(58) Field of Classification Search
CPC ...... H04N 19/597; H04N 19/59; H04N 19/44; H04N 19/11; H04N 19/122; H04N 19/107; H04N 19/124
(Continued)

(56) References Cited

U.S. PATENT DOCUMENTS 9,241,168 B2    1/2016  Kim et al.
2012/0183066 A1  7/2012  Oh et al.
(Continued)

FOREIGN PATENT DOCUMENTS

KR    10-2008-0092359 A    10/2008
KR    10-2011-0054244 A    5/2011
(Continued)

OTHER PUBLICATIONS

Fabian Jager, Simplified Depth Map Intra Coding with an Optional Depth Lookup Table, Oct. 13-19, 2012, International Conference on 3D Imaging (IC3D), IEEE.*
(Continued)

*Primary Examiner* — Zaihan Jiang

(74) *Attorney, Agent, or Firm* — Sughrue Mion, PLLC

(57) ABSTRACT

An inter-layer video decoding method according to an embodiment of the present invention may comprise the steps of: obtaining prediction mode information for a current block of a depth image from a bitstream; creating a prediction block of the current block on the basis of the obtained prediction mode information; predicting an average value for the prediction block by using the pixel values of a designated location of the prediction block; and decoding the depth image by using the average value for the prediction block.

7 Claims, 34 Drawing Sheets

(51) Int. Cl.
| | | |
|---|---|---|
| H04N 19/11 | (2014.01) | |
| H04N 19/124 | (2014.01) | |
| H04N 19/176 | (2014.01) | |
| H04N 19/122 | (2014.01) | |
| H04N 19/107 | (2014.01) | |
| H04N 19/44 | (2014.01) | |
| H04N 19/159 | (2014.01) | |

(52) U.S. Cl.
CPC ......... *H04N 19/122* (2014.11); *H04N 19/124* (2014.11); *H04N 19/159* (2014.11); *H04N 19/176* (2014.11); *H04N 19/44* (2014.11); *H04N 19/59* (2014.11)

(58) Field of Classification Search
USPC .................................................. 375/240.13
See application file for complete search history.

(56) References Cited

U.S. PATENT DOCUMENTS

| | | | | |
|---|---|---|---|---|
| 2013/0195169 | A1* | 8/2013 | Jang | H04N 19/00424 375/240.02 |
| 2013/0222534 | A1* | 8/2013 | Rusanovskyy | H04N 13/0011 348/43 |
| 2013/0271565 | A1* | 10/2013 | Chen | H04N 13/0048 348/43 |
| 2014/0003518 | A1 | 1/2014 | Bang et al. | |
| 2014/0098189 | A1* | 4/2014 | Deng | H04N 13/0048 348/43 |
| 2014/0136728 | A1* | 5/2014 | Xu | H04N 21/816 709/231 |
| 2014/0307786 | A1* | 10/2014 | Deng | H04N 19/597 375/240.12 |
| 2014/0376635 | A1* | 12/2014 | Senoh | H04N 13/0048 375/240.16 |
| 2015/0098508 | A1* | 4/2015 | Yie | H04N 19/597 375/240.16 |
| 2015/0130898 | A1* | 5/2015 | Johansson | H04N 19/597 348/43 |
| 2015/0131724 | A1* | 5/2015 | Lin | H04N 19/56 375/240.14 |
| 2015/0229957 | A1* | 8/2015 | Zhao | H04N 19/597 375/240.12 |
| 2015/0245061 | A1* | 8/2015 | Chen | H04N 19/597 375/240.13 |
| 2015/0341636 | A1* | 11/2015 | Tsai | H04N 19/597 375/240.02 |
| 2015/0365698 | A1* | 12/2015 | Lin | H04N 19/597 375/240.12 |

FOREIGN PATENT DOCUMENTS

| | | |
|---|---|---|
| KR | 10-2012-0083200 A | 7/2012 |
| KR | 10-2012-0116363 A | 10/2012 |

OTHER PUBLICATIONS

Jager, "Simplified Depth Map Intra Coding with an Optional Depth Lookup Table", 2012 International Conference on 3D Imaging (IC3D), Dec. 2012, 6 pages total.

Jager, et al.; "Model-Based Intra Coding for Depth Maps in 3D Video Using a Depth Lookup Table", 2012 3DTV-Conference: The True Vision—Capture, Transmission and Display of 3D Video (3DTV-CON), Oct. 2012, 6 pages total.

Communication dated Oct. 17, 2014, issued by the International Searching Authority in counterpart International Application No. PCT/KR2014/006569 (PCT/ISA/210, PCT/ISA/220, PCT/ISA/237).

"Advanced Video Coding for Generic Audiovisual Services", Series H: Audiovisual and Multimedia Systems, Infrastructure of Audiovisual Services—Coding of Moving Video, Telecommunication Standardization Sector of ITU, Feb. 2014, 790 pages total.

Jo, et al., "CE6: Simplified DC calculation for SDC", 2013, Joint Collaborative Team on 3D Video Coding Extensions of ITU-T SG 16 WP3 and ISO/IEC JTC 1/SC 29/WG 11, JCT3V-E0117, 5th Meeting, Vienna, Austria, XP 030131130, pp. 1-6.

Jäger, et al., "CE6: Results on Complexity Reduction for Simplified Depth Coding (SDC)", 2013, Joint Collaborative Team on 3D Video Coding Extensions of ITU-T SG 16 WP3 and ISO/IEC JTC 1/SC 29/WG 11, JCT3V-E0031, 5th Meeting, Vienna, Austria, XP 030131029, pp. 1-3.

Zheng, et al., "Reference Samples sub-sampling for SDC and DMM", 2013, Joint Collaborative Team on 3D Video Coding Extensions of ITU-T SG 16 WP3 and ISO/IEC JTC 1/SC 29/WG 11, JCT3V-C154, 3rd Meeting, Geneva, CH, XP 030130570, pp. 1-5.

Jäger, et al., "3D-CE6.h: Simplified Depth Coding with an optional Depth Lookup Table", 2012, Joint Collaborative Team on 3D Video Coding Extensions of ITU-T SG 16 WP3 and ISO/IEC JTC 1/SC 29/WG 11, JCT3V-B0036, 2nd Meeting, Shanghai, China, XP 030130217, 16 pages total.

Tech, et al., "3D-HEVC Test Model 2", 2012, Joint Collaborative Team on 3D Video Coding Extensions of ITU-T SG 16 WP3 and ISO/IEC JTC 1/SC 29/WG 11, JCT3V-B1005_d0, 2nd Meeting, Shanghai, China, XP 030130414, 118 pages total.

Communication dated Feb. 17, 2017, issued by the European Patent Office in counterpart European Patent Application No. 14825659.7.

Communication dated Feb. 23, 2018, issued by The State Intellectual Property Office of P.R. China in counterpart Chinese application No. 201480051588.1.

\* cited by examiner

| SIZE OF PREDICTION UNIT | AVERAGE VALUE |
|---|---|
| 4x4 | $\{6(SUM_{hor}+SUM_{ver})+40(RT+LB)+2^6)\}>>7$ |
| 8x8 | $\{28(SUM_{hor}+SUM_{ver})+288(RT+LB)+2^9)\}>>10$ |
| 16x16 | $\{120(SUM_{hor}+SUM_{ver})+2176(RT+LB)+2^{12})\}>>13$ |
| 32x32 | $\{496(SUM_{hor}+SUM_{ver})+16896(RT+LB)+2^{15})\}>>16$ |
| 64x64 | $\{2016(SUM_{hor}+SUM_{ver})+133120(RT+LB)+2^{18})\}>>19$ |

CODING UNIT (1710)

ly corresponds to significantly changing depth values may
minimize errors of a synthesized image.

INTRA SCENE PREDICTION METHOD OF DEPTH IMAGE FOR INTERLAYER VIDEO DECODING AND ENCODING APPARATUS AND METHOD

TECHNICAL FIELD

The inventive concept relates to inter-layer video encoding and decoding methods, and more particularly, to a method of in-screen prediction of a depth image to be used in methods and apparatuses for encoding and decoding depth images.

BACKGROUND ART

A stereoscopic image refers to a 3-dimensional (3D) image that provides image data together with depth data and shape data regarding a space. While a stereo image provides images respectively corresponding to difference viewpoints of the left eye and the right eye, a stereoscopic image provides an image as if the image is viewed from a different location when a viewer changes his/her viewpoint. Therefore, images captured at various viewpoints are required to generate a stereoscopic image.

Images captured at various viewpoints to generate a stereoscopic image constitute a massive amount of data. Therefore, in consideration of network infrastructures and the ground wave bandwidth, it is almost impossible to display a stereoscopic image even if the stereoscopic image is coded by using an encoding apparatus optimized to single-view video encoding techniques, such as MPEG-2, H.265/AVC, and HEVC.

Therefore, a multiview (multilayer) image encoding apparatus is required to generate a stereoscopic image. In particular, it is necessary to develop a technique for efficiently reducing redundancy between time points and viewpoints.

For example, a multiview video codec may improve compression efficiency by compressing a basic viewpoint by using a single-view video encoding technique and encoding expanded viewpoints with reference to the basic viewpoint. Furthermore, by further encoding additional data like a depth image, an image including more viewpoints than viewpoints input via a decoder may be generated. Here, the depth image is used for synthesizing intermediate viewpoint images instead of being directly displayed to a user, where degradation of the depth image deteriorates the quality of a synthesized image. Therefore, it is necessary for a multiview video codec to efficiently compress not only a multiview video, but also a depth image.

DETAILED DESCRIPTION OF THE INVENTIVE CONCEPT

Technical Problem

Since a depth image is additional data used to synthesize intermediate viewpoint images in a decoder, it is necessary to encode the depth image in consideration of an effect thereof on a synthesized image. A depth value of a depth image is significantly changed near a boundary of an object and is less significant inside the object. In particular, minimization of errors occurring at the boundary of an object corresponding to significantly changing depth values may minimize errors of a synthesized image.

Meanwhile, in order to encode a depth image, a current block may be encoded via a certain prediction mode (e.g., a DC mode, a planar mode, and a DMM (depth modeling mode) prediction mode). In particular, an average value (referred to hereinafter as a 'DC value') for a block to be encoded is determined, and an index is calculated by mapping the determined DC value to a depth lookup table. Furthermore, an encoding apparatus transmits only a difference between an index calculated based on a DC value for an original block and an index calculated based on a DC value for a prediction block to a decoding apparatus.

Meanwhile, a calculation process for summing all pixel values belonging to a prediction block and dividing the sum by the number of corresponding pixels is used to calculate a DC value for the prediction block, where such a calculation process for accumulating and dividing pixel values may increase complexity of an encoding apparatus and a decoding apparatus.

Technical Solution

According to an aspect of the inventive concept, there is provided an inter-layer video decoding method including obtaining prediction mode information regarding a current block of a depth image from a bitstream; generating a prediction block for the current block based on the obtained prediction mode information; predicting an average value for the prediction block by using pixel values corresponding to certain locations of the prediction block; and decoding the depth image by using the average value for the prediction block.

Advantageous Effects

According to inter-layer video decoding/encoding apparatuses and methods according to some exemplary embodiments, a depth image may be efficiently encoded or decoded, thereby lowering the complexity of the apparatuses and efficiently generating an image with synthesized viewpoints.

BEST MODE

Figure 1A:
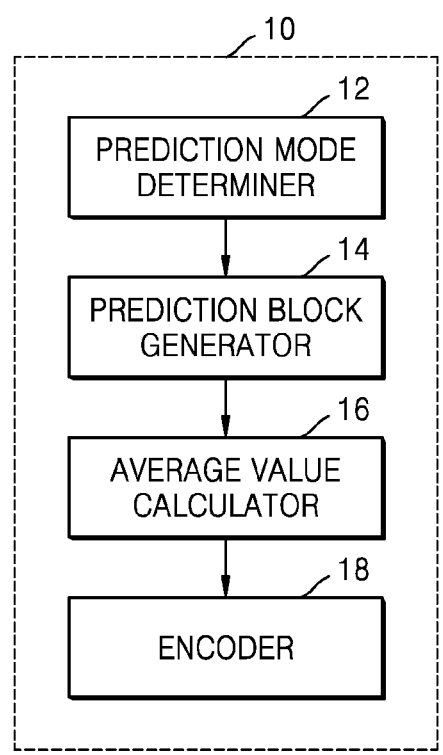
FIG. 1A is a block diagram of an inter-layer video encoding apparatus according to some exemplary embodiments.

According to an aspect of the inventive concept, there is provided an inter-layer video decoding method including obtaining prediction mode information regarding a current block of a depth image from a bitstream; generating a prediction block for the current block based on the obtained prediction mode information; predicting an average value for the prediction block by using pixel values corresponding to certain locations of the prediction block; and decoding the depth image by using the average value for the prediction block.

According to some exemplary embodiments, the predicting of the average value for the generated prediction block may include predicting the average value for the generated prediction block by using the left-top pixel value, the right-top pixel value, the left-bottom pixel value, and the right-bottom pixel value of the prediction block.

According to some exemplary embodiments, the predicting of the average value for the generated prediction block may include predicting the average value for the generated prediction block by weighted-summing the left-top pixel value, the right-top pixel value, the left-bottom pixel value, and the right-bottom pixel value of the prediction block.

According to some exemplary embodiments, the predicting of the average value for the generated prediction block may include determining whether a depth lookup table regarding the depth image exists; and, if the depth lookup table exists, predicting the average value for the generated prediction block by using the left-top pixel value, the right-top pixel value, the left-bottom pixel value, and the right-bottom pixel value of the prediction block.

According to some exemplary embodiments, the prediction block may be predicted in one of a DC mode, a planar mode, an angular mode, and a depth modeling mode (DMM) prediction mode.

According to some exemplary embodiments, the decoding of the depth image by using the average value for the prediction block may include determining a prediction index corresponding to the average value for the prediction block by using the depth lookup table; determining a restoration index corresponding to an average value for a restored block regarding the current block by using an index residue value obtained from the bitstream; determining the average value for the restored block corresponding to the restoration index by using the depth lookup table; and decoding the depth image by using the average values regarding the prediction block and the restored block.

According to some exemplary embodiments, the inter-layer video decoding method may further include predicting an average value for the prediction block by using at least one neighboring pixel value of the current block.

According to an aspect of the inventive concept, there is provided an inter-layer video decoding apparatus including an prediction mode determiner, which obtains prediction mode information regarding a current block of a depth image from a bitstream; an prediction block generator, which generates a prediction block for the current block based on the obtained prediction mode information; an average value calculator, which predicts an average value for the prediction block by using pixel values corresponding to certain locations of the prediction block; and a decoder, which decodes the depth image by using the average value for the prediction block.

According to some exemplary embodiments, the prediction mode determiner may predict the average value for the generated prediction block by using the left-top pixel value, the right-top pixel value, the left-bottom pixel value, and the right-bottom pixel value of the prediction block.

According to some exemplary embodiments, the prediction mode determiner may predict the average value for the generated prediction block by weighted-summing the left-top pixel value, the right-top pixel value, the left-bottom pixel value, and the right-bottom pixel value of the prediction block.

According to some exemplary embodiments, the prediction mode determiner may determine whether a depth lookup table regarding the depth image exists and, if the depth lookup table exists, predicts the average value for the generated prediction block by using the left-top pixel value, the right-top pixel value, the left-bottom pixel value, and the right-bottom pixel value of the prediction block.

According to some exemplary embodiments, the prediction block may be predicted in one of a DC mode, a planar mode, an angular mode, and a depth modeling mode (DMM) prediction mode.

According to some exemplary embodiments, the decoder may determine a prediction index corresponding to the average value for the prediction block by using the depth lookup table, determines a restoration index corresponding to an average value for a restored block regarding the current block by using an index residue value obtained from the bitstream, determines the average value for the restored block corresponding to the restoration index by using the depth lookup table, and decodes the depth image by using the average values regarding the prediction block and the restored block.

According to some exemplary embodiments, the average value calculator may predict an average value for the prediction block by using at least one neighboring pixel value of the current block.

According to an aspect of the inventive concept, there may be provided another method, another system, and a non-transitory computer readable recording medium having recorded thereon a computer program for implementing the inter-layer video decoding method.

Mode of the Inventive Concept

Hereinafter, a method of in-screen prediction of a depth image for methods and apparatuses for inter-layer video decoding and encoding according to exemplary embodiments will be described with reference to FIGS. 1A through 7C.

Also, a video encoding technique and a video decoding technique, which are based on coding units having a tree structure, according to exemplary embodiments applicable to the inter-layer video encoding and decoding techniques will be described with reference to FIGS. 8 through 20. Also, various exemplary embodiments to which the video encoding method and the video decoding method are applicable, will be described with reference to FIGS. 21 through 27.

Hereinafter, an 'image' may denote a still image or a moving image of a video, or a video itself.

Hereinafter, a 'sample' denotes data that is assigned to a sampling location of an image and is to be processed. For example, pixels in an image of a spatial domain may be samples.

Hereinafter, a 'current block' may denote a block of an image to be encoded or decoded.

First, a method of in-screen prediction of a depth image for methods and apparatuses for inter-layer video decoding and encoding according to some exemplary embodiments, will be described with reference to FIGS. 1A through 7C.

Figure 1B:
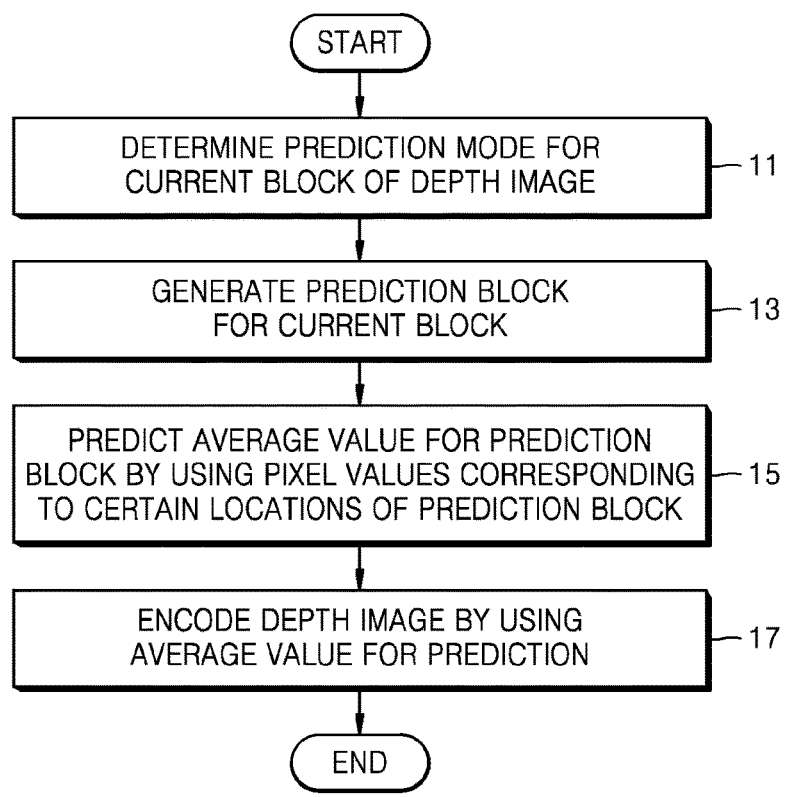
FIG. 1B is a flowchart of a video encoding method according to some exemplary embodiments.

FIG. 1A is a block diagram of an inter-layer video encoding apparatus 10 according to some exemplary embodiments. FIG. 1B is a flowchart of a video encoding method according to some exemplary embodiments.

The inter-layer video encoding apparatus 10 according to some exemplary embodiments may include a prediction mode determiner 12, a prediction block generator 14, an average value calculator 16, and an encoder 18. Furthermore, the inter-layer video encoding apparatus 10 according to some exemplary embodiments may include a central processor (not shown) that controls the prediction mode determiner 12, the prediction block generator 14, the average value calculator 16, and the encoder 18. Alternatively, each of the prediction mode determiner 12, the prediction block generator 14, the average value calculator 16, and the encoder 18 is operated by its own processor (not shown) and, as the processors (not shown) operate in a mutually organic relationship, the overall inter-layer video encoding apparatus 10 may be operated. Alternatively, the prediction mode determiner 12, the prediction block generator 14, the average value calculator 16, and the encoder 18 may be controlled by an external processor (not shown) outside the inter-layer video encoding apparatus 10.

The inter-layer video encoding apparatus 10 may include one or more data storage units (not shown) for storing data input to and output by the prediction mode determiner 12, the prediction block generator 14, the average value calculator 16, and the encoder 18. The inter-layer video encoding apparatus 10 may include a memory controller (not shown) for managing data input and output of the one or more data storage units (not shown).

In order to output a video encoding result, the inter-layer video encoding apparatus 10 may operate in conjunction with an internal video encoding processor embedded therein or an external video encoding processor, thereby performing a video encoding process including a transformation. The internal video encoding processor of the inter-layer video encoding apparatus 10 may be an individual processor and perform a video encoding process. Furthermore, the inter-layer video encoding apparatus 10, the central processor, or a video processor may include a video encoding processing module, thereby performing a basic video encoding process The inter-layer video encoding apparatus 10 according to some exemplary embodiments may classify a plurality of image sequences according to layers and encode each of the image sequences according to a scalable video coding method, and output separate streams including data encoded according to layers. The inter-layer video encoding apparatus 10 may encode a first layer image sequence and a second layer image sequence to different layers.

For example, according to a scalable video coding method based on spatial scalability, low resolution images may be encoded as first layer images, and high resolution images may be encoded as second layer images. An encoding result of the first layer images is output as a first layer stream, and an encoding result of the second layer images is output as a second layer stream.

As another example, a multiview video may be encoded according to a scalable video coding method. In this case, central view images may be encoded as first layer images, and left view images and right view images may be encoded as second layer images referring to the first layer images. Alternatively, when the inter-layer video encoding apparatus 10 allows at least three layers, for example, first through third layers, central view images may be encoded as first layer images, left view images may be encoded as second layer images, and right view images may be encoded as third layer images. Of course, an exemplary embodiment is not limited thereto, and layers and referenced layers obtained by encoding central view, left view, and right view images may vary.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding high frame rate images by referring to the base frame rate images.

Also, scalable video coding may be performed on a first layer and a plurality of second layers. When there are at least three second layers, first layer images and first through K-th second layer images may be encoded. Accordingly, an encoding result of the first layer images may be output as a first layer stream, and encoding results of the first through K-th second layer images may be respectively output as first through K-th second layer streams.

The inter-layer video encoding apparatus 10 according to some exemplary embodiment may perform inter prediction in which images of a single layer are referenced in order to predict a current picture. By performing inter prediction, a motion vector indicating motion information between a current picture and a reference picture, and a residual between the current picture and the reference picture may be generated.

Also, the inter-layer video encoding apparatus 10 may perform inter-layer prediction in which first layer images are referenced in order to predict second layer images.

Also, when the inter-layer video encoding apparatus 10 according to some exemplary embodiments allows at least three layers, i.e., first through third layers, inter-layer prediction between a first layer image and a third layer image, and inter-layer prediction between a second layer image and a third layer image may be performed according to a multi-layer prediction structure.

Via inter-layer prediction, a position difference component between a current picture and a reference picture of a layer different from that of the current picture and a residual between the current picture and the reference picture of the different layer may be generated.

An inter-layer prediction structure will be described later with reference to FIG. 3.

The inter-layer video encoding apparatus 10 according to some exemplary embodiments may perform encoding according to blocks of each image of a video, according to layers. A block may have a square shape, a rectangular shape, or an arbitrary geometrical shape, and is not limited to a data unit having a certain size. The block may be a maximum coding unit, a coding unit, a prediction unit, or a transformation unit, among coding units according to a tree structure. A maximum coding unit including coding units of a tree structure may be called differently, such as a coding tree unit, a coding block tree, a block tree, a root block tree, a coding tree, a coding root, or a tree trunk. Video encoding and decoding methods based on coding units according to a tree structure will be described later with reference to FIGS. 8 through 20.

Meanwhile, if the inter-layer video encoding apparatus 10 according to some exemplary embodiments encodes a multiview video, the inter-layer video encoding apparatus 10 may additionally encode supplementary data, such as a depth image, and thus an image including more viewpoints than viewpoints input via a decoder may be generated. Here, since the depth image is used for synthesizing intermediate viewpoint images instead of being directly displayed to a user, degradation of the depth image may affect the quality of a synthesized image.

A depth value of a depth image is significantly changed nearby a boundary of an object and is less significant inside the object. Therefore, minimization of errors occurring at the boundary of an object corresponding to significantly changing depth values may minimize errors of a synthesized image. Furthermore, an efficiency of encoding a depth image may be improved by relatively reducing data amount with respect to the interior of an object in which a depth value is changed less significantly.

Therefore, the inter-layer video encoding apparatus 10 may encode a current block of a depth image by using a certain prediction mode (e.g., a DC mode, a planar mode, an angular mode, or a depth modeling mode (DMM) prediction mode). Furthermore, the inter-layer video encoding apparatus 10 may calculate a DC value (referred to hereinafter as an 'average value') with respect to a block to be encoded and map the calculated average value to a depth lookup table, thereby determining an index. Here, the depth lookup table refers to a table in which possible depth values of depth images are matched to indexes.

Furthermore, the inter-layer video encoding apparatus 10 may transmit only a difference between an index determined by mapping an average value for an original block to depth lookup table and an index calculated based on an average value obtained from a prediction block to a decoding apparatus.

Meanwhile, a calculation process for summing all pixel values belonging to a prediction block and dividing the sum by the number of corresponding pixels may be used to calculate an average value for the prediction block, where such a calculation process for accumulating and dividing pixel values may increase complexity of an encoding apparatus and a decoding apparatus.

Therefore, the complexity of the inter-layer video encoding apparatus 10 according to some exemplary embodiments may be lowered by predicting an average value for a prediction block by using only pixel values corresponding to pixels located at certain locations from among pixels of the prediction block.

Hereinafter, operations of the inter-layer video encoding apparatus 10 according to some exemplary embodiments will be described in detail with reference to FIG. 1B.

In operation 11, the prediction mode determiner 12 may determine a prediction mode for a current block of a depth image. Here, the prediction mode may be one of a DC mode, a planar mode, an angular mode, or a depth modeling mode (DMM) prediction mode. Here, the DMM prediction mode may include a DMM mode-1 (or DMM_WFULL mode) and a DMM mode-4 (or DMM_CPREDTEX mode).

Here, the DC mode is an intra prediction mode for filling prediction samples of a prediction block with an average value of neighboring reference samples.

Furthermore, the planar mode is an intra prediction mode for calculating prediction samples predSample[x][y], with x,y=0 . . . nTbS−1 with respect to reference sample p[x][y] according to Equation 1 below.

predSamples[x][y]=((nTbS1x)*p[1][y]|(x|1)*p[nTbS][1]|(nTbS−1−y)*p[x][−1]+(y+1)*p[−1][nTbS]+nTbS)>>(Log 2(nTbS)+1)  [Equation 1]

Here, nTbS denotes a horizontal length or a vertical length of a prediction block.

Furthermore, the angular mode refers to a prediction mode for determining a prediction sample from among reference samples in consideration of direction of in-screen prediction modes from mode 2 to mode 34.

Furthermore, the DMM prediction mode is a mode for performing predictions by dividing a current block into at least two areas according to a pattern, where an average value is calculated for each of the areas. Meanwhile, the DMM prediction mode may include a DMM mode-1 and a DMM mode-4. The DMM mode-1 may be a mode that the inter-layer video encoding apparatus 10 divides a current block by applying various boundaries and divides the current block based on the most appropriate boundary, whereas the DMM mode-4 may be a mode for dividing a prediction block into at least two or more blocks according to a pattern of the texture of the current block.

Meanwhile, the DC mode, the planar mode, the angular mode, and the depth modeling mode (DMM) prediction mode are modes for performing in-screen prediction by using restored pixels around a current block and are obvious to one of ordinary skill in the art. Therefore, detailed descriptions thereof will be omitted.

Furthermore, the prediction mode determiner 12 may determine whether a prediction mode for the current block is a mode using an average value of a prediction block described below.

In operation 13, the prediction block generator 14 may generate a prediction block for the current block based on the determined prediction mode.

In operation 15, the average value calculator 16 may predict an average value for the prediction block by using pixel values corresponding to certain locations of the prediction block.

For example, the average value calculator 16 may predict an average value for the prediction block by using a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block. In detail, instead of obtaining an average value by using all pixel values in the prediction block, the average value calculator 16 may predict an average value for the prediction block by weighted-summing a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block. However, the inventive concept is not limited thereto, and average value for the prediction block may be predicted by using at least one or more pixel values per area (e.g., four pixel values corresponding to the left-top area and four pixel values corresponding to the right-top area).

In another example, the average value calculator 16 may predict a pixel value corresponding to the right-bottom area of the generated prediction block as an average value of the prediction block.

Furthermore, the average value calculator 16 may obtain different average values regarding the prediction block in different prediction modes.

For example, if a depth lookup table exists and the prediction block is predicted in the DC mode or the planar mode, the average value calculator 16 may predict an average value for the generated prediction block by using a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block.

Alternatively, if the prediction block is predicted in the DMM prediction mode, the average value calculator 16 may predict an average value of each of areas divided from the prediction block by using a pixel value corresponding to the left-top pixel of the prediction block, a pixel value corresponding to the right-top pixel of the prediction block, a pixel value corresponding to the left-bottom pixel of the prediction block, and a pixel value corresponding to the right-bottom pixel of the prediction block.

In another example, the average value calculator 16 may predict an average value for a generated prediction block by using pixel values at different locations according to prediction modes regarding the current block.

In operation 17, the encoder 18 may encode the depth image by using the average value for the prediction block. Meanwhile, operations of the encoder 18 for encoding a depth image by using an average value for a prediction block will be described below in detail with reference to FIG. 5A.

As described above, the inter-layer video encoding apparatus 10 may lower complexity of a method of calculating an average value for a prediction block, and thus a depth image may be efficiently encoded.

Figure 2A:
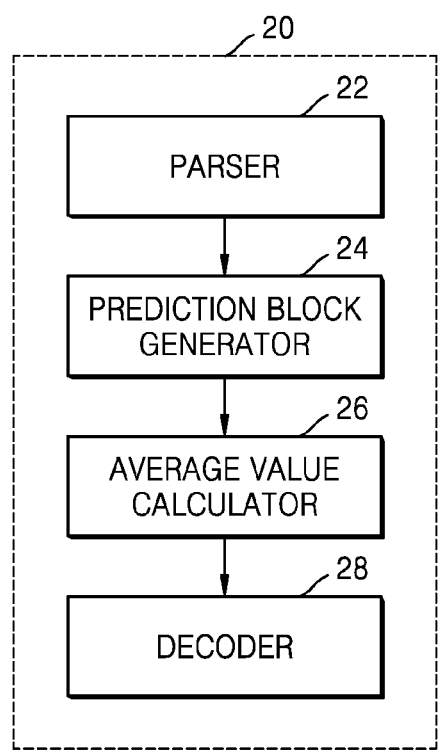
FIG. 2A is a block diagram of an inter-layer video decoding apparatus according to some exemplary embodiments.

FIG. 2A is a block diagram of an inter-layer video decoding apparatus 20 according to some exemplary embodiments.

The inter-layer video decoding apparatus 20 according to some exemplary embodiments may include a parser 22, a prediction block generator 24, an average value calculator 26, and a decoder 28. Furthermore, the inter-layer video decoding apparatus 20 according to some exemplary embodiments may include a central processor (not shown) that controls the parser 22, the prediction block generator 24, the average value calculator 26, and the decoder 28. Alternatively, each of the parser 22, the prediction block generator 24, the average value calculator 26, and the decoder 28 is operated by its own processor (not shown) and, as the processors (not shown) operate in a mutually organic relationship, the overall inter-layer video decoding apparatus 20 may be operated. Alternatively, the parser 22, the prediction block generator 24, the average value calculator 26, and the decoder 28 may be controlled by an external processor (not shown) outside the inter-layer video decoding apparatus 20.

The inter-layer video decoding apparatus 20 may include one or more data storage units (not shown) for storing data input to and output by the parser 22, the prediction block generator 24, the average value calculator 26, and the decoder 28. The inter-layer video decoding apparatus 20 may include a memory controller (not shown) for managing data input and output of the one or more data storage units (not shown).

In order to reconstruct a video via video decoding, the inter-layer video decoding apparatus 20 according to some exemplary embodiments may operate in cooperation with an internal video encoding processor installed therein or an external video encoding processor so as to perform video decoding operations including transformation. The internal video encoding processor of the multi-layer video decoding apparatus 20 according to some exemplary embodiments may be a separate processor, or alternatively, the inter-layer video decoding apparatus 20, a central processing apparatus, or a graphic processing apparatus may include a video decoding processing module to perform basic video decoding operations.

The inter-layer video decoding apparatus 20 according to some exemplary embodiments may receive bitstreams according to layers, via a scalable encoding method. The number of layers of bitstreams received by the inter-layer video decoding apparatus 20 is not limited.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multiview video may be decoded according to a scalable video coding method. When a stereoscopic video stream is received in a plurality of layers, a first layer stream may be decoded to reconstruct left view images. A second layer stream may be further decoded to reconstruct right view images.

Alternatively, when a multiview video stream is received in a plurality of layers, a first layer stream may be decoded to reconstruct central view images. A second layer stream may be further decoded to reconstruct left view images. A third layer stream may be further decoded to reconstruct right view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to first layer reconstruction images, second layer images may be further reconstructed. When K-th layer stream is further decoded by referring to second layer reconstruction images, K-th layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and decode inter-layer predicted data between a plurality of layers. Reconstruction may be performed through motion compensation and inter-layer decoding based on a coding unit or a prediction unit.

Images may be reconstructed by performing motion compensation for a current picture by referencing reconstruction images predicted via inter prediction of a same layer, with respect to each layer stream. Motion compensation is an operation in which a reconstruction image of a current picture is reconstructed by composing a reference picture determined by using a motion vector of the current picture and a residual of the current picture.

Also, the inter-layer video decoding apparatus 20 may perform inter-layer decoding by referring to prediction information of first layer images so as to decode a second layer image predicted via inter-layer prediction. Inter-layer decoding is an operation in which prediction information of a current picture is reconstructed by using prediction information of a reference block of a different layer so as to determine the prediction information of the current picture.

The inter-layer video decoding apparatus 20 according to some exemplary embodiments may perform inter-layer decoding for reconstructing third layer images predicted by referencing second layer images. An inter-layer prediction structure will be described later with reference to FIG. 3

The inter-layer video decoding apparatus 20 performs decoding according to blocks of each image of a video. A block may be, from among coding units according to a tree structure, a maximum coding unit, a coding unit, a prediction unit, or a transformation unit. Methods for encoding and decoding based on coding units according to a tree structure will be described below with reference to FIGS. 8 to 20.

Meanwhile, if the inter-layer video encoding apparatus 10 according to some exemplary embodiments encodes a multiview video, the inter-layer video encoding apparatus 10 may additionally encode supplementary data, such as a depth image, and thus an image including more viewpoints than viewpoints input via a decoder may be generated. Here, since the depth image is used for synthesizing intermediate viewpoint images instead of being directly displayed to a user, degradation of the depth image may affect the quality of a synthesized image.

A depth value of a depth image is significantly changed nearby a boundary of an object and is less significant inside the object. Therefore, minimization of errors occurring at the boundary of an object corresponding to significantly changing depth values may minimize errors of a synthesized image. Furthermore, an efficiency of encoding a depth image may be improved by relatively reducing data amount with respect to the interior of an object in which a depth value is changed less significantly.

Therefore, in order to decode a depth image, the inter-layer video decoding apparatus 20 may generate a prediction block by using a certain prediction mode (e.g., a DC mode, a planar mode, an angular mode, or a depth modeling mode (DMM) prediction mode). In particular, the inter-layer video decoding apparatus 20 may calculate a DC value (referred to hereinafter as an 'average value') with respect to a block to be encoded and map the calculated average value to a depth lookup table, thereby determining an index. Furthermore, the inter-layer video decoding apparatus 20 may receive a difference between an index corresponding to an average value for a restored block and an index corresponding to an average value for the prediction block via a bitstream.

Furthermore, the inter-layer video decoding apparatus 20 may determine an average value for a restored block by using the difference between indexes and the depth lookup table and restore the depth image by using a difference between the average value for the restored block and the average value for the prediction block as an offset.

Meanwhile, a calculation process for summing all pixel values belonging to a prediction block and dividing the sum by the number of corresponding pixels may be used to calculate an average value for the prediction block, where such a calculation process for accumulating and dividing pixel values may increase complexity of an encoding apparatus and a decoding apparatus.

Therefore, the complexity of the inter-layer video encoding according to some exemplary embodiments may be lowered by predicting an average value for a prediction block by using only pixel values corresponding to pixels located at certain locations from among pixels of the prediction block.

Figure 2B:
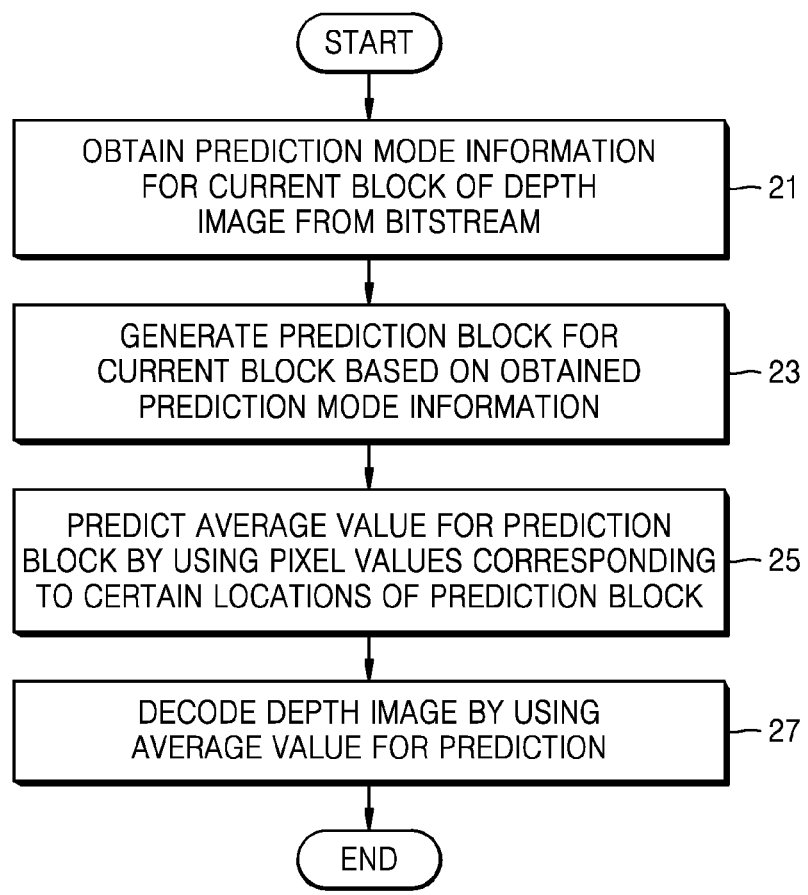
FIG. 2B is a flowchart showing an inter-layer decoding method according to some exemplary embodiments.

Hereinafter, operations of the inter-layer video decoding apparatus 20 according to some exemplary embodiments will be described in detail with reference to FIG. 2B.

In operation 21, the parser 22 may obtain prediction mode information regarding a current block of a depth image from a bitstream. Here, the prediction mode may be one of a DC mode, a planar mode, an angular mode, or a depth modeling mode (DMM) prediction mode. Here, the DMM prediction mode may include a DMM mode-1 (or DMM_WFULL mode) and a DMM mode-4 (or DMM_CPREDTEX mode).

Furthermore, the parser 22 may obtain information indicating whether the prediction mode for the current block is a mode using an average value for a prediction block.

In operation 23, the prediction block generator 24 may generate a prediction block for the current block based on the obtained prediction mode information.

In operation 25, the average value calculator 26 may predict an average value for the prediction block by using pixel values corresponding to certain locations of the prediction block.

For example, the average value calculator 26 may predict an average value for the prediction block by using a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block. In detail, instead of obtaining an average value by using all pixel values in the prediction block, the average value calculator 26 may predict an average value for the prediction block by weighted-summing a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block. However, the inventive concept is not limited thereto, and average value for the prediction block may be predicted by using at least one or more pixel values per area (e.g., four pixel values corresponding to the left-top area and four pixel values corresponding to the right-top area).

In another example, the average value calculator 26 may predict a pixel value corresponding to the right-bottom area of the generated prediction block as an average value of the prediction block.

Furthermore, the average value calculator 26 may obtain different average values regarding the prediction block in different prediction modes.

For example, if a depth lookup table exists and the prediction block is predicted in the DC mode or the planar mode, the average value calculator 26 may predict an average value for the generated prediction block by using a pixel value corresponding to the left-top area of the prediction block, a pixel value corresponding to the right-top area of the prediction block, a pixel value corresponding to the left-bottom area of the prediction block, and a pixel value corresponding to the right-bottom area of the prediction block.

Alternatively, if the prediction block is predicted in the DMM prediction mode, the average value calculator 26 may predict an average value of each of areas divided from the prediction block by using a pixel value corresponding to the left-top pixel of the prediction block, a pixel value corresponding to the right-top pixel of the prediction block, a pixel value corresponding to the left-bottom pixel area of the prediction block, and a pixel value corresponding to the right-bottom pixel of the prediction block.

In operation 27, the decoder 28 may decode the depth image by using the average value for the prediction block. Meanwhile, operations of the decoder 28 for decoding a depth image by using an average value for a prediction block will be described below in detail with reference to FIG. 5B.

As described above, the inter-layer video decoding apparatus 20 may lower complexity of a method of calculating an average value for a prediction block, and thus a depth image may be efficiently decoded.

Hereinafter, an inter-layer prediction structure that may be performed in the inter-layer video encoding apparatus 10 according to some exemplary embodiments will be described with reference to FIG. 3.

Figure 3:
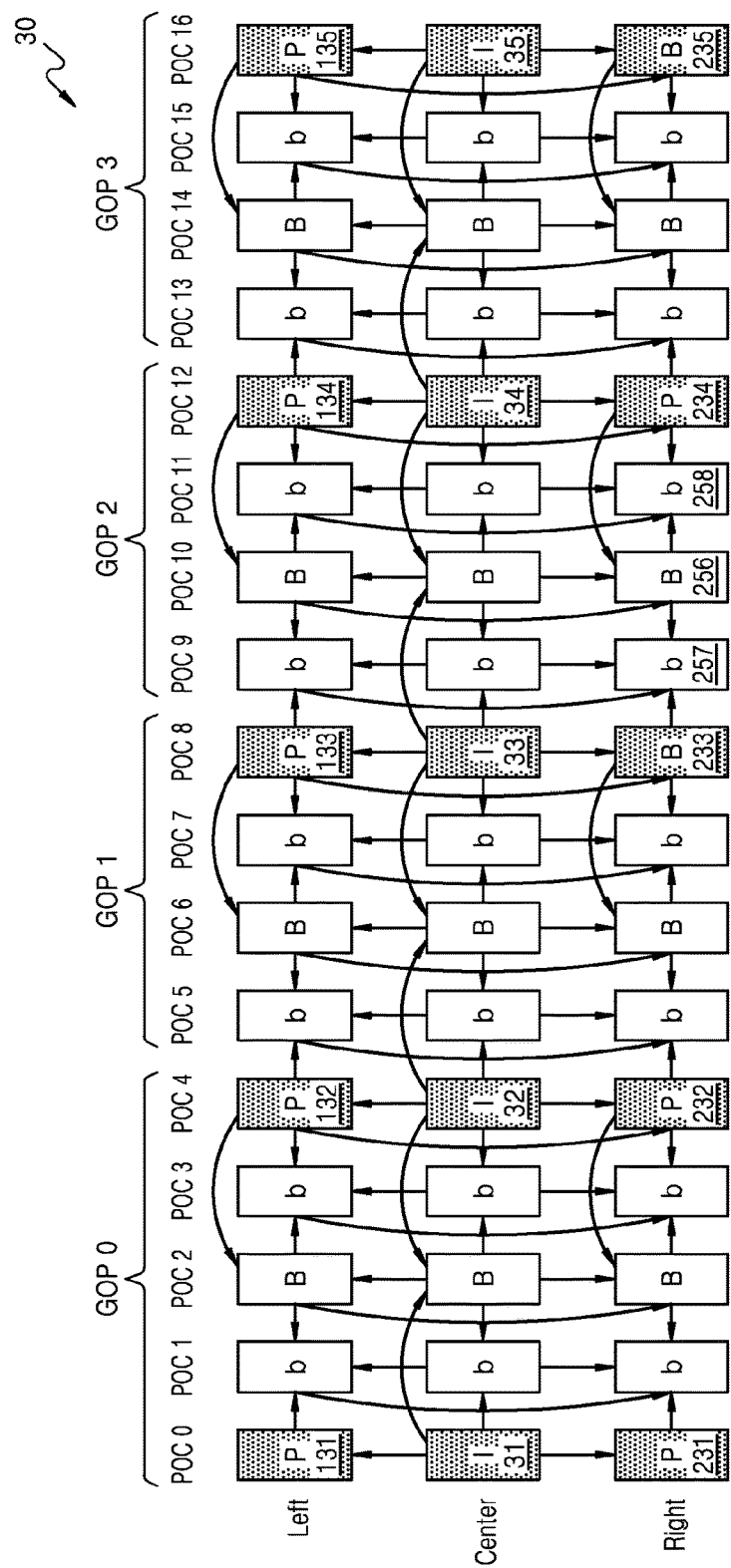
FIG. 3 is a diagram of an inter-layer prediction structure according to some exemplary embodiments.

FIG. 3 is a diagram of an inter-layer prediction structure according to some exemplary embodiments.

The inter-layer video encoding apparatus 10 according to some exemplary embodiment may prediction-encode base view images, left view images, and right view images according to a reproduction order 30 of a multiview video prediction structure of FIG. 3.

According to the reproduction order 30 of the multiview video prediction structure according to a related technology, images of the same view are arranged in a horizontal direction. Accordingly, the left view images indicated by 'Left' are arranged in the horizontal direction in a row, the base view images indicated by 'Center' are arranged in the horizontal direction in a row, and the right view images indicated by 'Right' are arranged in the horizontal direction in a row. Compared to the left/right view images, the base view images may be central view images.

Also, images having the same picture order count (POC) order are arranged in a vertical direction. A POC order of images indicates a reproduction order of images forming a video. TOC X' indicated in the reproduction order 30 of the multiview video prediction structure indicates a relative reproduction order of images in a corresponding column, wherein a reproduction order is in front when a value of X is low, and is behind when the value of X is high.

Thus, according to the reproduction order 30 of the multiview video prediction structure according to the related technology, the left view images indicated by 'Left' are arranged in the horizontal direction according to the POC order (reproduction order), the base view images indicated by 'Center' are arranged in the horizontal direction according to the POC order (reproduction order), and the right view images indicated by 'Right' are arranged in the horizontal direction according to the POC order (reproduction order). Also, the left view image and the right view image located on the same column as the base view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 31 through 35, the left view images include left view anchor pictures 131 through 135, and the right view images include right view anchor pictures 231 through 235.

Multiview images may be reproduced and predicted (reconstructed) according to a GOP order. First, according to the reproduction order 30 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 1 may be predicted (reconstructed), and then the images included in GOP 1 may be predicted (reconstructed), according to views. In other words, the images included in each GOP may be predicted (reconstructed) in an order of GOP 0, GOP 1, GOP 2, and GOP 3.

According to the reproduction order 30 of the multiview video prediction structure, inter-view prediction (inter-layer prediction) and inter prediction are performed on images. In the multiview video prediction structure, an image where an arrow starts is a reference picture, and an image where an arrow ends is an image predicted by using a reference picture.

A prediction result of base view images may be encoded and then output in a form of a base view image stream, and a prediction result of additional view images may be encoded and then output in a form of a layer bitstream. Also, a prediction encoding result of left view images may be output as a first layer bitstream, and a prediction encoding result of right view images may be output as a second layer bitstream.

Only inter-prediction is performed on base view images. In other words, the base layer anchor pictures 31 through 35 of an I-picture type do not refer to other images, but remaining images of B- and b-picture types are predicted by referring to other base view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left view images and right view images.

Inter-view prediction (inter-layer prediction) may be performed on the left view anchor pictures 131 through 135 by respectively referring to the base view anchor pictures 31 through 35 having the same POC order. Inter-view prediction may be performed on the right view anchor pictures 231 through 235 by respectively referring to the base view anchor pictures 31 through 35 or the left view anchor pictures 131 through 135 having the same POC order. Also, inter-view prediction (inter-layer prediction) may be performed on remaining images other than the left view images 131 through 135 and the right view images 231 through 235 by referring to other view images having the same POC order.

Remaining images other than the anchor pictures 131 through 135 and 231 through 235 from among left view images and right view images are predicted by referring to the same view images.

However, each of the left view images and the right view images may not be predicted by referring to an anchor picture that has a preceding reproduction order from among additional view images of the same view. In other words, in order to perform inter prediction on a current left view image, left view images excluding a left view anchor picture that precedes the current left view image in a reproduction order may be referenced. Similarly, in order to perform inter prediction on a current right view image, right view images excluding a right view anchor picture that precedes the current right view image in a reproduction order may be referenced.

Also, in order to perform inter prediction on a current left view image, prediction may be performed by referring to a left view image that belongs to a current GOP but is to be reconstructed before the current left view image, instead of referring to a left view image that belongs to a GOP before the current GOP of the current left view image. The same is applied to a right view image.

The inter-layer video decoding apparatus 20 according to some exemplary embodiments may reconstruct base view images, left view images, and right view images according to the reproduction order 30 of the multiview video prediction structure of FIG. 3.

Left view images may be reconstructed via inter-view disparity compensation that references base view images and inter motion compensation that references left view images. Right view images may be reconstructed via inter-view disparity compensation that references base view images and left view images, and inter motion compensation that references right view images. Reference pictures may be reconstructed first for disparity compensation and motion compensation of left view images and right view images.

For inter motion compensation of a left view image, left view images may be reconstructed via inter motion compensation that references a reconstructed left view reference picture. For inter motion compensation of a right view image, right view images may be reconstructed via inter motion compensation that references a reconstructed right view reference picture.

Also, for inter motion compensation of a current left view image, only a left view image that belongs to a current GOP of the current left view image but is to be reconstructed before the current left view image may be referenced, and a left view image that belongs to a GOP before the current GOP is not referenced. The same is applied to a right view image.

Hereinafter, referring to FIGS. 4A through 7C, a method of in-screen prediction of a depth image for methods and apparatuses for encoding and decoding depth images according to some exemplary embodiments will be described in detail.

Figure 4A:
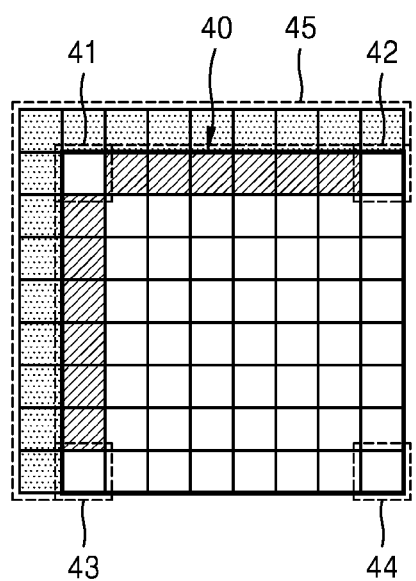
FIG. 4A is a diagram for describing a method of calculating an average value for a prediction block, according to some exemplary embodiments.

FIG. 4A is a diagram for describing a method of calculating an average value for a prediction block 40, according to some exemplary embodiments.

Referring to FIG. 4A, the inter-layer video decoding apparatus 20 according to some exemplary embodiments may predict an average value for a prediction block 40 by using pixel values corresponding to certain locations of the prediction block 40. Here, the prediction block 40 may be generated via a prediction in the DC mode or the planar mode. For example, if the prediction block 40 is generated via a prediction in the DC mode, sample values of the prediction block 40 may be filled with an average value of neighboring reference samples 45 that are already restored.

At the 8×8 prediction block 40, the inter-layer video decoding apparatus 20 may predict an average value of a left-top pixel value 41, a right-top pixel value 42, a left-bottom pixel value 43, and a right-bottom pixel value 44 as the average value for the prediction block 40. In another example, the average value of the prediction block 40 may be predicted via weighted-summing as shown in Equation 2 below.

$$dc=(\alpha_1 \cdot P_{left\text{-}top}+\alpha_2 \cdot P_{right\text{-}top}+\alpha_3 \cdot P_{left\text{-}bottom}+\alpha_4 \cdot P_{right\text{-}bottom}+\beta)>>\gamma \quad \text{[Equation 2]}$$

Here, dc denotes an average value for a prediction block, and each P denotes, in the order shown, the left-top pixel value 41, the right-top pixel value 42, the left-bottom pixel value 43, and the right-bottom pixel value 44, and α, β, and γ denote variables for obtaining a weighted-sum.

Meanwhile, although the above description according to the present embodiment is given with respect to the 8×8 prediction block 40 only, the same may be applied to a 4×4 block, a 16×16 block, a 32×32 block, and a 64×64 block.

Furthermore, the above-stated embodiment may be embodied as the below process according to a depth lookup table and a prediction mode for a prediction block.

In this process, inputs are a location (xCb, yCb) of a current block in a current picture, a horizontal or vertical length nTbS of a transformation block, and an intra prediction mode predModeIntra. Here, the location of the current block may be indicated by the location of the left-top sample of the current block. Furthermore, the outputs of this process are sample depth values resSamples[x][y] of a restored depth image. Here, each of x and y may have a value from 0 to nTbS−1.

First, the pixel value predSamples[x][y] of a prediction block is determined according to a prediction mode.

Next, the restored sample depth values resSamples[x][y] may be derived based on a flag Dlt Flag[nuh_layer_id] as shown below.

If the flag Dlt Flag[nuh_layer_id] is 0, while x and y are changing from 0 to nTbS−1, the restored sample depth values resSamples[x][y] may be determined by using the pixel value predSamples[x][y] of the prediction block and an offset value DcOffset[xTb][yTb][wedgePattern[x][y] received from a bitstream.

If the flag Dlt Flag[nuh_layer_id] is 1 (a depth lookup table exists), variables dcPred[0] and dcPred[1] may be derived as shown below.

1. If the intra prediction mode predModeIntra is not INTRA_DMM_WFULL or INTRA_DMM_CPREDTEX, Table 1 below is applied.

TABLE 1

| dcPred[ 0 ] = ( predSamples[ 0 ][ 0 ] + predSamples[ 0 ][ nTbS − 1 ] + predSamples[ nTbS − 1 ][ 0 ] + predSamples[ nTbS − 1 ][ nTbS − 1 ] + 2 )>> 2 |
|---|

In other words, based on Table 1 above, an average value of the left-top pixel value, the right-top pixel value, the left-bottom pixel value, and the right-bottom pixel value of the prediction block may be predicted as an average value dcPred[0] regarding the prediction block. The average value is transformed to an index by using a depth lookup table, and then the index is added to an index difference received from a bitstream. A restored average value may be obtained by inversely-transforming the added index by using the depth lookup table. Furthermore, a difference between the restored average value and the average value for the prediction block may be determined as an offset value. Finally, while x and y are changing from 0 to nTbS−1, the restored sample depth values resSamples[x][y] may be determined by using the pixel value predSamples[x][y] regarding the prediction block and the offset value calculated by using the depth lookup table.

2. On the contrary, if the intra prediction mode predModeIntra is INTRA_DMM_WFULL or INTRA_DMM_CPREDTEX, the variable dcPred is set to DcVal. Here, DcVal denotes an average value obtained by using neighboring reference samples of the current block.

Meanwhile, although an example for obtaining an average value for a prediction block by using four corner pixel values of the prediction block is described above with respect to the embodiment shown in FIG. 4A, the inventive concept is not limited thereto.

Figure 4B:
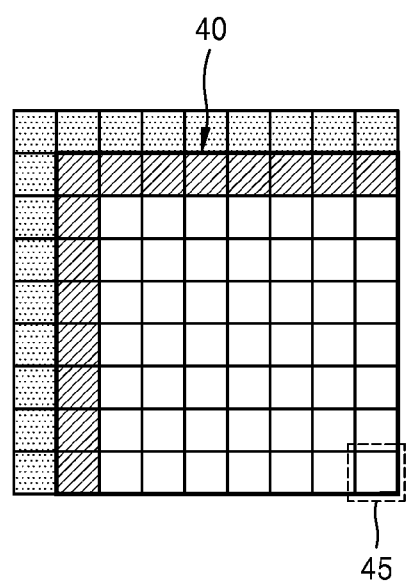
FIG. 4B is a diagram for describing another example of a method of calculating an average value for a prediction block, according to some exemplary embodiments.

FIG. 4B is a diagram for describing another example of a method of calculating an average value for a prediction block, according to some exemplary embodiments.

Referring to FIG. 4B, at the prediction block 40, the lower-right pixel value 45 may be predicted as an average value for the prediction block 40.

Meanwhile, the method shown in FIG. 4B may be applied only when the prediction block 40 is generated in a particular prediction mode. For example, the method shown in FIG. 4B may be applied only when the prediction block 40 is generated in the DC prediction mode.

Figure 4C:
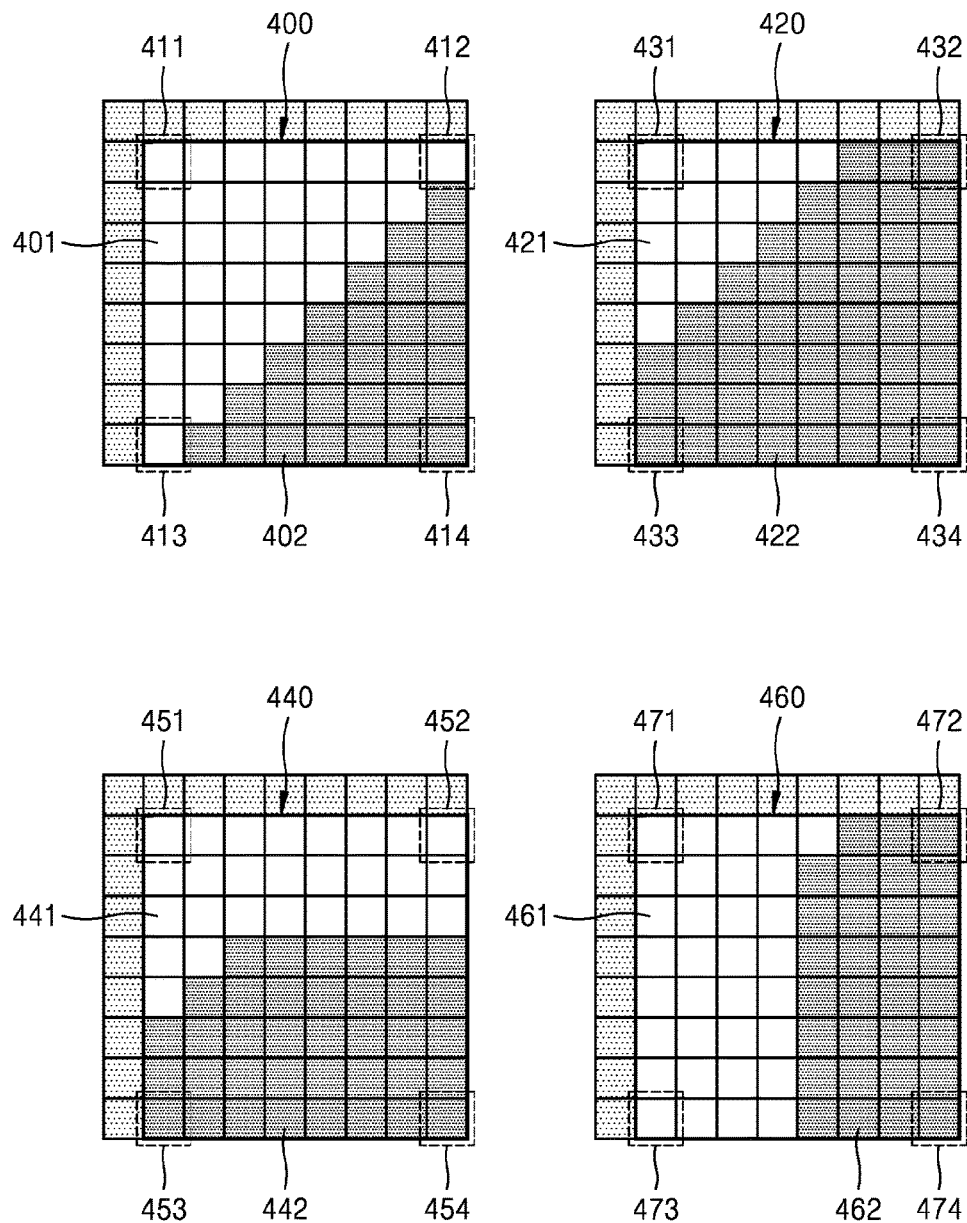
FIG. 4C is a diagram for describing a method of calculating an average value for a prediction block using the DMM prediction mode, according to some exemplary embodiments.

FIG. 4C is a diagram for describing a method of calculating an average value for a prediction block using the DMM prediction mode, according to some exemplary embodiments.

Here, the DMM prediction mode is a mode for performing predictions by dividing a current block into at least two areas according to a pattern, where an average value is calculated for each of the areas. Meanwhile, the DMM prediction mode may include a DMM mode-1 (or DMM_WFULL mode) and a DMM mode-4 (or DMM_CPREDTEX mode). The DMM mode-1 may be a mode that the inter-layer video encoding apparatus 10 divides a current block by applying various boundaries and divides the current block based on the most appropriate boundary, whereas the DMM mode-4 may be a mode for dividing a prediction block into at least two or more blocks according to a pattern of the texture of the current block.

Referring to FIG. 4C, each of prediction blocks 400, 420, 440, and 460 predicted in the DMM mode-1 is divided into two areas. FIG. 4C shows four possible cases of dividing a prediction block in the DMM mode-1.

Even in case where a prediction block is divided in the DMM mode-1, the inter-layer video decoding apparatus 20 according to some exemplary embodiments may obtain an average value for each of areas divided from the prediction block by using the left-top pixel value, the right-top pixel value, the left-bottom pixel value, and the right-bottom pixel value.

For example, in the first dividing pattern 400, an average value for an area-1 401 is calculated based on the left-top pixel value 411, the right-top pixel value 412, and the left-bottom pixel value 413 of a corresponding block, whereas an average value for an area-2 402 is calculated from the right-bottom pixel value 414 of the corresponding block.

In the second dividing pattern 420, an average value for an area-1 421 is calculated from the left-top pixel value 431 of a corresponding block, whereas an average value for an area-2 422 is calculated from the right-top pixel value 432, the left-bottom pixel value 433, and the right-bottom pixel value 434 of the corresponding block.

In the third dividing pattern 440, an average value for an area-1 441 is calculated from the left-top pixel value 451 and the right-top pixel value 452 of a corresponding block, whereas an average value for an area-2 442 is calculated from the left-bottom pixel value 453 and the right-bottom pixel value 454 of the corresponding block.

In the fourth dividing pattern 460, an average value for an area-1 461 is calculated from the left-top pixel value 471 and the right-top pixel value 472 of a corresponding block, whereas an average value for an area-2 462 is calculated from the left-bottom pixel value 473 and the right-bottom pixel value 474 of the corresponding block. Here, although the calculation of a DC value regarding a 8×8 block is described above with reference to FIG. 4C, average values regarding respective areas of a 16×16, 32×32, or 64×64 prediction block generated in the DMM mode-1 may be calculated in the same regard.

In another example, average value for respective areas may be calculated by using respective pixel values (e.g., the left-top pixel value and the right-bottom pixel value of a corresponding prediction block). For example, in case of the first dividing pattern 400, an average value for the area-1 401 may be calculated from the left-top pixel value 411 of a corresponding block, whereas an average value for the area-2 402 may be calculated from the right-bottom pixel value 414 of the corresponding block.

Figure 5A:
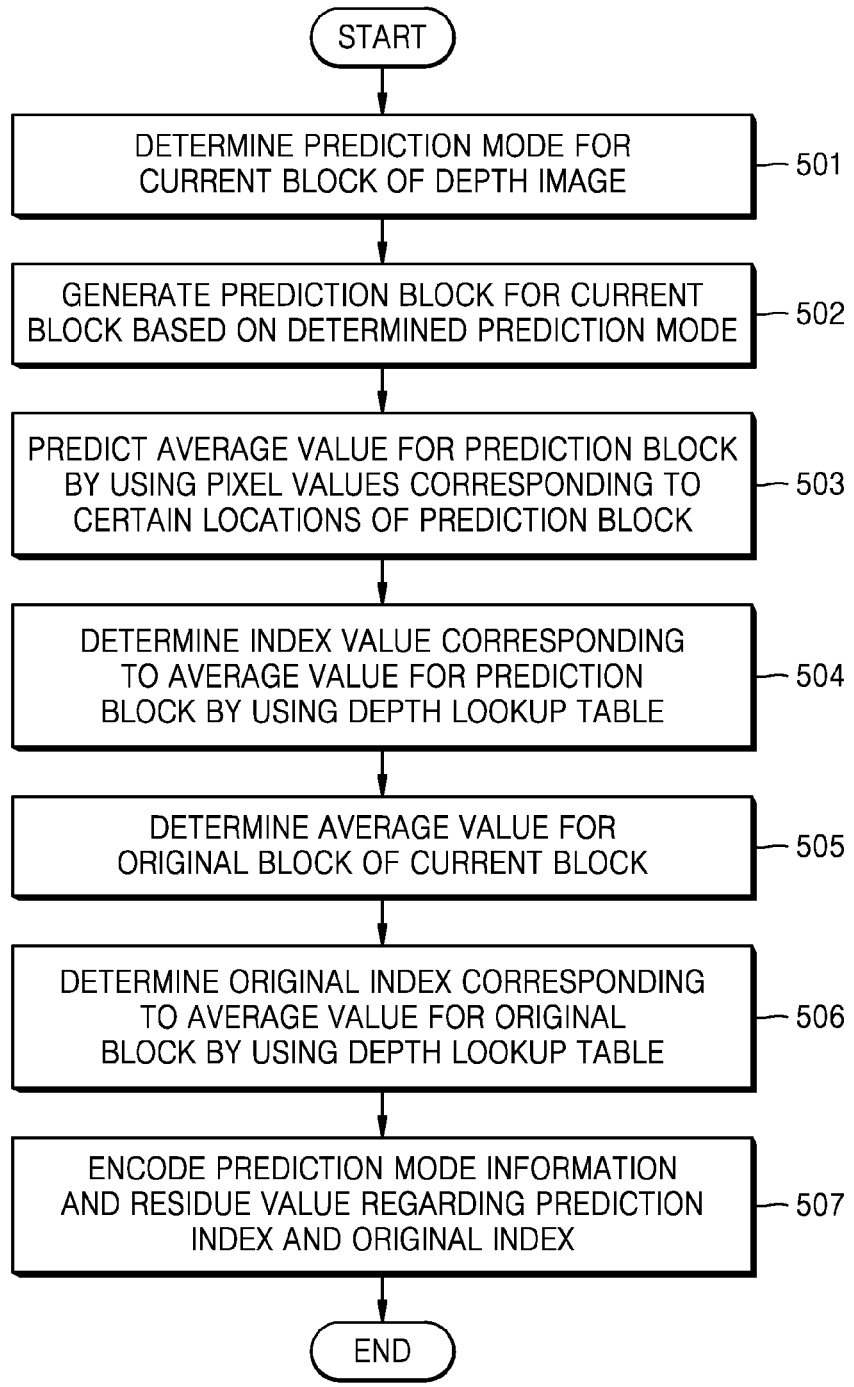
FIG. 5A is a flowchart showing a method of encoding a depth image by using an average value for a prediction block and a depth lookup table, according to some exemplary embodiments.

FIG. 5A is a flowchart showing a method of encoding a depth image by using an average value for a prediction block and a depth lookup table, according to some exemplary embodiments.

Referring to FIG. 5A, in operation 501, the prediction mode determiner 12 may determine a prediction mode for a current block of a depth image. Here, the prediction mode may be one of the DC mode, the planar mode, the angular mode, or the depth modeling mode (DMM) prediction mode.

In operation 502, the prediction block generator 14 may generate a prediction block for the current block based on the determined prediction mode.

In operation 503, the average value calculator 16 may predict an average value for the prediction block by using pixel values corresponding to certain locations of the prediction block.

In operation 504, the encoder 18 may determine a prediction index corresponding to the average value for the prediction block by using a depth lookup table. Here, the depth lookup table refers to a table in which possible depth values of depth images are matched to indexes.

For example, if a depth value 128 is matched to an index value 1 in the depth lookup table, the encoder 18 may determine the prediction index as 1 when the average value for the prediction block is 128.

In operation 505, the encoder 18 may determine an average value for an original block corresponding to the current block. For example, the encoder 18 may determine an average value for an area of an original depth image corresponding to the current block.

In operation 506, the encoder 18 may determine an original index corresponding to the average value for the original block by using the depth lookup table.

Next, in operation 507, the encoder 18 may encode prediction mode information and a difference between the prediction index and the original index (referred to hereinafter as an 'index residue value') and transmit the same to the inter-layer video decoding apparatus 20. Therefore, the inter-layer video encoding apparatus 10 may reduce an amount of bits to transmit by transmitting a difference between an index corresponding to an average value for a current prediction block and an index corresponding to an average value for an original block.

Figure 5B:
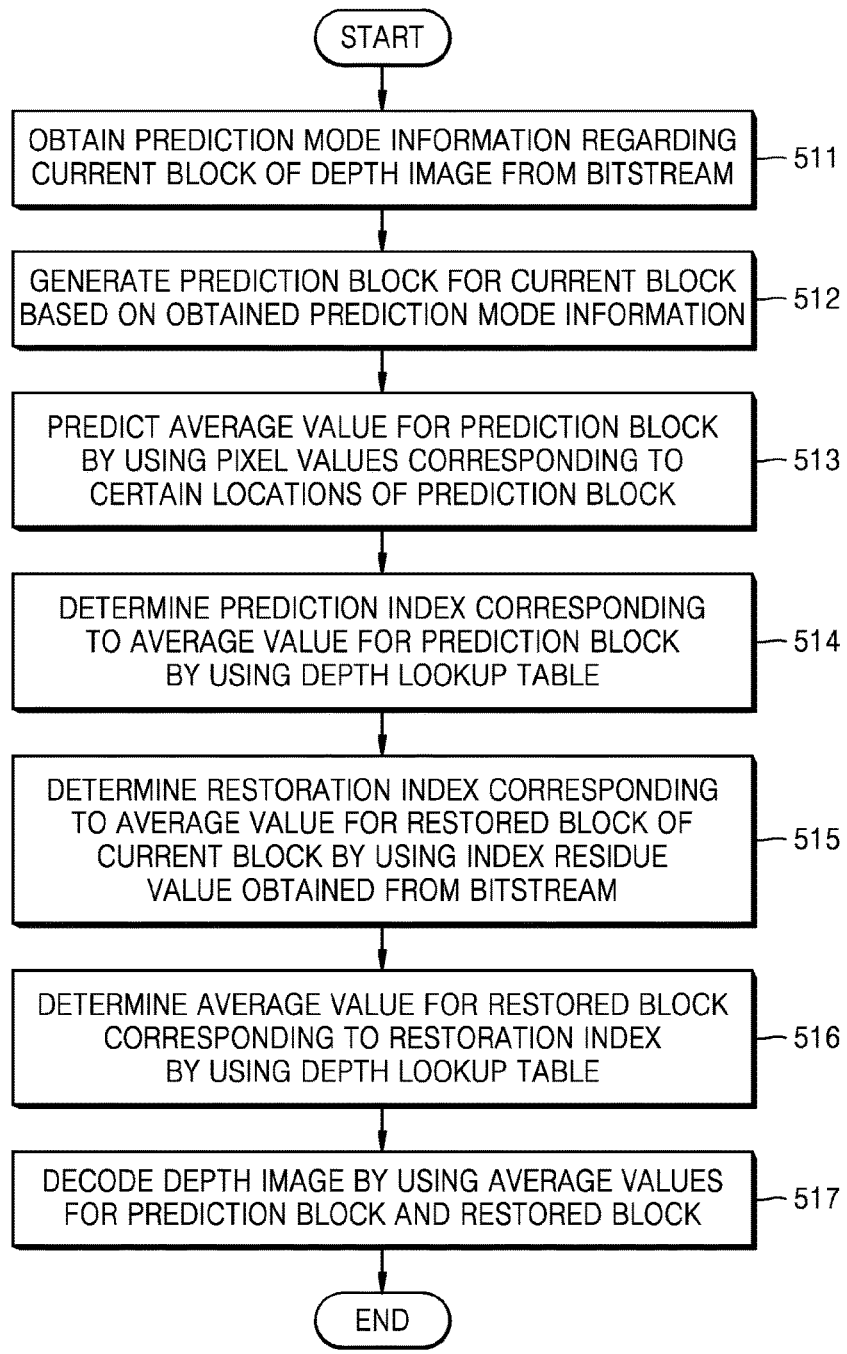
FIG. 5B is a flowchart showing a method of decoding a depth image by using an average value for a prediction block and a depth lookup table, according to some exemplary embodiments.

FIG. 5B is a flowchart showing a method of decoding a depth image by using an average value for a prediction block and a depth lookup table, according to some exemplary embodiments.

In operation 511, the parser 22 may obtain prediction mode information regarding a current block of a depth image from a bitstream. Here, the prediction mode information may indicate in which of the DC mode, the planar mode, an angular mode, or the depth modeling mode (DMM) prediction mode the current block is to be predicted.

In operation 512, the prediction block generator 24 may generate a prediction block for the current block based on the obtained prediction mode information.

In operation 513, the average value calculator 26 may predict an average value for the prediction block by using pixel values corresponding to certain locations of the prediction block.

For example, an average value for the generated prediction block may be predicted by using the left-top pixel value, the right-top pixel value, the left-bottom pixel value, and the right-bottom pixel value of the prediction block.

In operation 514, the decoder 28 may determine a prediction index corresponding to the average value for the prediction block by using a depth lookup table.

In operation 515, the decoder 28 may determine a restoration index corresponding to an average value for a restored block of a current block by using an index residue value obtained from the bitstream. Here, the index residue value refers to a difference between an index corresponding to an average value for the prediction block and an index corresponding to an average value for an original block as described above with respect to the operation 507 of FIG. 5A. For example, the restoration index may be determined by performing a calculation for adding the index residue value to the prediction index.

In operation 516, the decoder 28 may determine an average value for the restored block corresponding to the restoration index by using a depth lookup table.

In operation 517, the decoder 28 may decode the depth image by using average values regarding the prediction block and the restored block. For example, a difference between the average value for the prediction block and the average value for the restored block may be determined as a DC offset regarding the prediction block. Therefore, the restored block may be generated by adding the DC offset to the generated prediction block.

The above embodiments are described in relation to a method of predicting an average value for a prediction block by using pixel values corresponding to certain locations in the prediction block. Hereinafter, an example of predicting an average value for a prediction block by using restored pixel values neighboring to a current block without generating a prediction block will be described with reference to FIGS. 6 through 7C.

Figure 6:
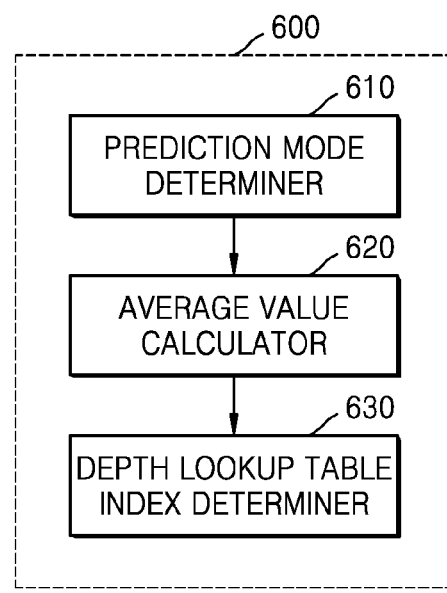
FIG. 6 is a diagram showing another example of an inter-layer video decoding apparatus according to some exemplary embodiments.

FIG. 6 is a diagram showing another example of an inter-layer video decoding apparatus according to some exemplary embodiments.

Referring to FIG. 6, an inter-layer video decoding apparatus 600 according to some exemplary embodiments consists of a prediction mode determiner 610, an average value calculator 620, and a depth lookup table index determiner 630.

If a current block to be decoded is encoded by using a simplified depth image encoding technique, the prediction mode determiner 610 determines in which of prediction modes including the DC mode, the planar mode, an angular mode, or the depth modeling mode (DMM) prediction mode the current block is encoded. Here, the simplified depth image encoding technique may refer to the method of encoding a depth image by using an average value for a prediction block as described above with reference to FIGS. 1A through 5B.

The average value calculator 620 calculates an average value for a prediction block directly from neighboring pixel values of the current block to be decoded. Detailed descriptions of a method of calculating the average value will be given below with reference to FIGS. 7A through 7C.

The depth lookup table index determiner 630 determines an indes value corresponding to the average value for the prediction block calculated by the average value calculator 620 by using a depth lookup table.

Figure 7A:
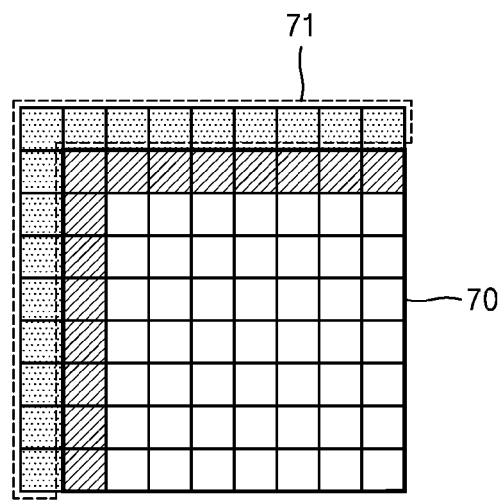
FIG. 7A is a diagram for describing another example of a method of calculating an average value for a prediction block in a DC prediction mode according to some exemplary embodiments.

For example, FIG. 7A is a diagram for describing another example of a method of calculating an average value for a prediction block in the DC prediction mode according to some exemplary embodiments.

Referring to FIG. 7A, before generating a prediction block for a current block 70 to be decoded in the DC prediction mode, the average value calculator 620 generates an average value for the prediction block directly from neighboring pixel values 71 of the current block 70 to be decoded. For example, if the current block 70 to be decoded is encoded in the DC prediction mode by using a simplified depth image encoding technique, a value dcVal is calculated according to Equation 3 below by using neighboring pixels around the current block 70 to be decoded, and the calculated dcVal is used as an average value for the corresponding block.

[Equation 3]

$$dcVal = \left( \sum_{x'=0}^{nTbS-1} p[x'][-1] + \sum_{y'=0}^{nTbS-1} p[-1][y'] + nTbS \right) >> (k+1)$$

where $k = \log 2(nTbS)$

Here, nTbS denotes a horizontal or vertical length of a block to be coded or decoded, x' denotes an index regarding a widthwise direction, and y' denotes an index regarding a lengthwise direction.

Figure 7B:
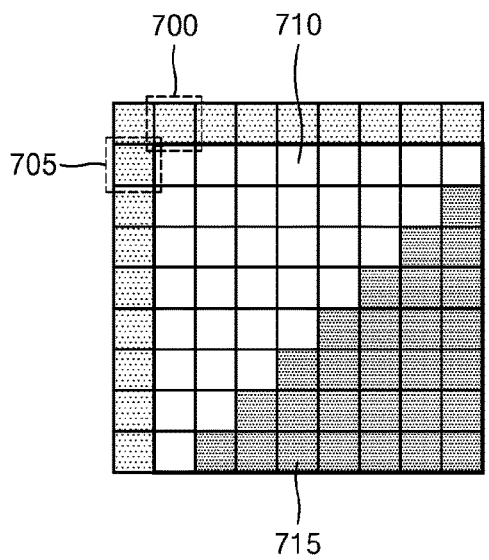
FIG. 7B is a diagram for describing another example of a method of calculating an average value for a prediction block in the DMM prediction mode, according to some exemplary embodiments.
Figure 7B:
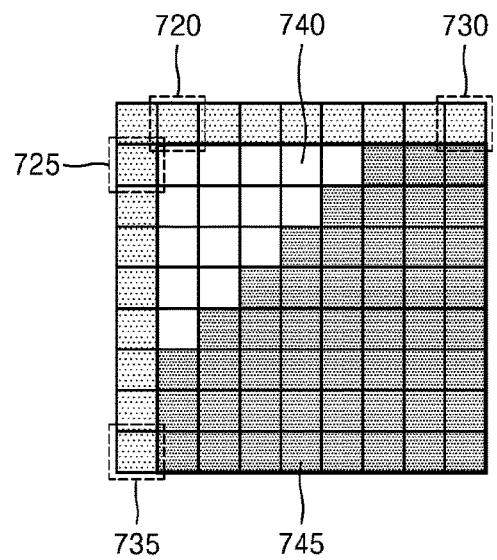
Figure 7B:
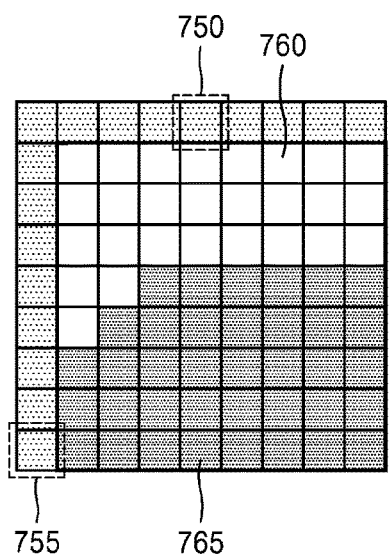
Figure 7B:
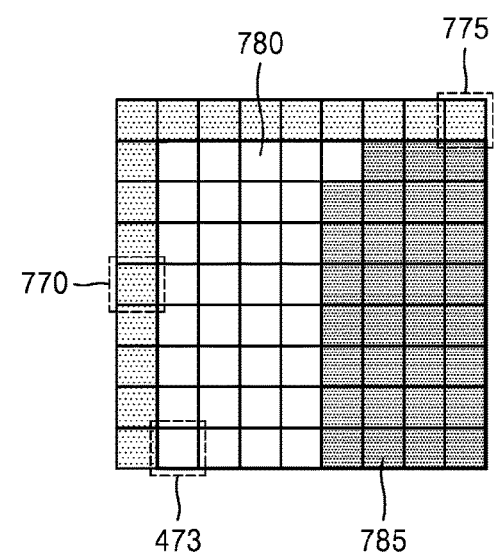

FIG. 7B is a diagram for describing another example of a method of calculating an average value for a prediction block in the DMM prediction mode, according to some exemplary embodiments.

Referring to FIG. 7B, before generating a prediction block for a current block to be decoded, the average value calculator 620 generates an average value for the prediction block directly from neighboring pixel values of the current block to be decoded. If the prediction mode of the current block is the DMM mode-1 prediction mode, the current block is divided into two areas. FIG. 7B shows four possible cases of dividing the current block in the DMM mode-1 prediction mode.

In a first dividing pattern, an average pixel value of neighboring pixels 700 and 705 of an area-1 710 is calculated as an average value for the corresponding area. However, in the first divided pattern, since there is no neighboring pixel of the corresponding area, a median value 128 of depth values may be calculated as a DC value regarding the first divided pattern.

In a second dividing pattern, an average pixel value of neighboring pixels 720 and 725 of an area-1 740 is calculated as an average value for the corresponding area. Furthermore, in the second dividing pattern, an average pixel value of neighboring pixels 730 and 735 of an area-2 745 is calculated as an average value for the corresponding area.

In a third dividing pattern, a neighboring pixel 750 of an area-1 760 is calculated as an average value for the corresponding area. Furthermore, in the third dividing pattern, a pixel value of neighboring pixel 755 of an area-2 765 is calculated as an average value for the corresponding area.

In a fourth dividing pattern, a neighboring pixel 770 of an area-1 780 is calculated as an average value for the corresponding area. Furthermore, in the fourth dividing pattern, a pixel value of neighboring pixel 775 of an area-2 785 is calculated as an average value for the corresponding area. Here, although the calculation of a DC value regarding a 8×8 block is described above with reference to FIG. 7B, DC values regarding respective areas of a 16×16, 32×32, or 64×64 prediction block may be calculated in the same regard.

Figure 7C:
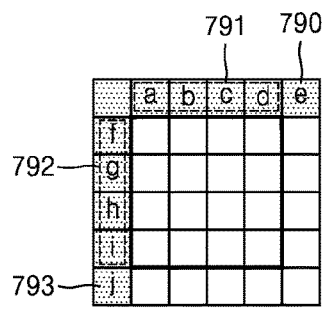
FIG. 7C is a diagram for describing a method of calculating an average value for a prediction block in a planar prediction mode according to some exemplary embodiments.

FIG. 7C is a diagram for describing a method of calculating an average value for a prediction block in the planar prediction mode according to some exemplary embodiments.

Referring to FIG. 7C, before generating a prediction block for a current block to be decoded, the average value calculator 620 generates an average value for the prediction block directly from neighboring pixel values of the current block. If the current block to be decoded is encoded in the planar prediction mode an average value for the corresponding prediction block may be calculated according to the equation shown in a table 794 of FIG. 7C.

For example, in case of a 4×4 block, an average value thereof is calculated to "(6×(SUMhor+SUMver)+40×(RT+LB)+26)>>7." Here, "SUMhor" denotes a sum 791 of neighboring pixels a, b, c, and d located above the current block. The "SUMver" denotes a sum 792 of neighboring pixels f, g, h, and I located at the left of the current block. "RT" denotes a neighboring pixel 790 of the current block located at the right-top corner of the current block, whereas "LB" denotes a neighboring pixel 793 of the current block located at the left-bottom corner of the current block. As described above, instead of generating pixel values of a prediction block in a prediction mode, the average value calculator 620 calculates a DC value according to the equation of the table 794 directly from values "SUMhor", "SUMver", "RT", and "LB" that are calculated from neighboring pixel values. Although the above descriptions of calculations for the values "SUMhor", "SUMver", "RT", and "LB" according to the present embodiment is given with respect to a 4×4 block, the same may be applied to larger blocks. Furthermore, to reduce complexity of encoding/decoding processes, a DC value may be directly calculated via a weighted calculation using some of the neighboring pixel values a, b, c, d, e, f, g, h, i, and j.

Meanwhile, for convenience of explanation, only operations performed by the inter-layer video decoding apparatuses 20 and 600 are described above with reference to FIGS. 4A through 4C and FIGS. 6 through 7C and operations performed by the inter-layer video encoding apparatus 10 are omitted. However, it would be obvious to one of ordinary skill in the art that operations corresponding to the operations performed by the inter-layer video decoding apparatuses 20 and 600 may be performed by the inter-layer video encoding apparatus 10.

As described above, the inter-layer video encoding apparatus 10 according to some exemplary embodiments and the inter-layer video decoding apparatus 20 according to some exemplary embodiments may spilt blocks of video data into coding units having a tree structure, and coding units, prediction units, and transformation units may be used for inter-layer prediction or inter prediction of coding units. Hereinafter, a video encoding method, a video encoding apparatus, a video decoding method, and a video decoding apparatus based on coding units having a tree structure and transformation units, according to some exemplary embodiments, will be described with reference to FIGS. 8 through 20.

In principle, during encoding and decoding processes for a multi-layer video, encoding and decoding processes for first layer images and encoding and decoding processes for second layer images are separately performed. In other words, when inter-layer prediction is performed on a multi-layer video, encoding and decoding results of single-layer videos may be mutually referred to, but separate encoding and decoding processes are performed according to single-layer videos.

Accordingly, since video encoding and decoding processes based on coding units having a tree structure as described below with reference to FIGS. 8 through 20 for convenience of description are video encoding and decoding processes for processing a single-layer video, only inter prediction and motion compensation are performed. However, as described above with reference to FIGS. 1A through 7, in order to encode and decode a video stream, inter-layer prediction and compensation may be performed on base layer images and second layer images.

Figure 8:
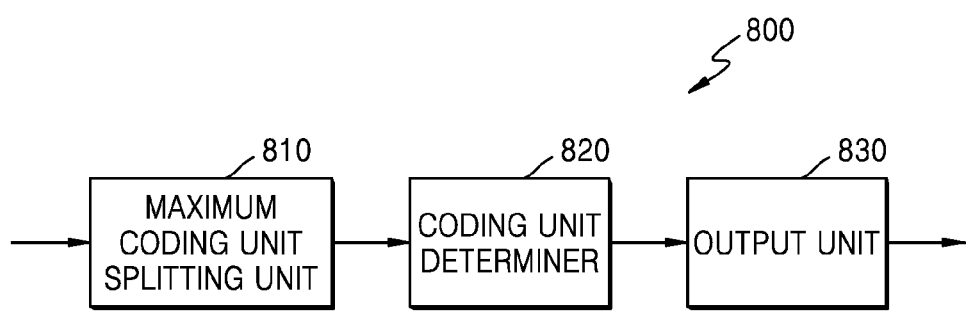
FIG. 8 is a block diagram of a video encoding apparatus based on coding units according to a tree structure, according to some exemplary embodiments.

Accordingly, in order for an encoder of an inter-layer video encoding apparatus according to some exemplary embodiments to encode a multi-layer video based on coding units having a tree structure, the inter-layer video encoding apparatus 10 may include as many video encoding apparatuses 800 of FIG. 8 as the number of layers of the multi-layer video so as to perform video encoding according to each single-layer video, thereby controlling each video encoding apparatus 800 to encode an assigned single-layer video. Also, the inter-layer video encoding apparatus 10 may perform inter-view prediction by using encoding results of individual single viewpoints of each video encoding apparatus 800. Accordingly, the encoder of the inter-layer video encoding apparatus may generate a base view video stream and a second layer video stream, which include encoding results according to layers.

Figure 9:
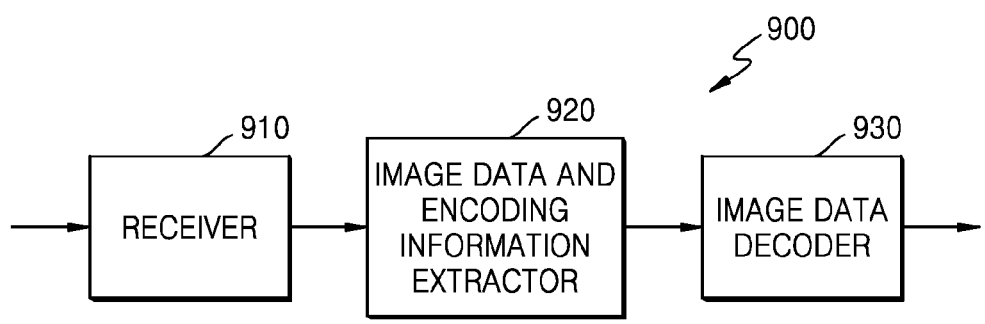
FIG. 9 is a block diagram of a video decoding apparatus based on coding units according to a tree structure, according to some exemplary embodiments of the inventive concept.

Similarly, in order for a decoder of an inter-layer video decoding apparatus according to some exemplary embodiments to decode a multi-layer video based on coding units having a tree structure, the inter-layer video decoding apparatus may include as many video decoding apparatuses 900 of FIG. 9 as the number of layers of the multi-layer video so as to perform video decoding according to layers with respect to a received first layer video stream and a received second layer video stream, thereby controlling each video decoding apparatus 900 to decode an assigned single-layer video. Also, the inter-layer video decoding apparatus 900 may perform inter-layer compensation by using a decoding result of an individual single layer of each video decoding apparatus 900. Accordingly, the decoder of the inter-layer video decoding apparatus may generate first layer images and second layer images, which are reconstructed according to layers.

FIG. 8 is a block diagram of the video encoding apparatus 800 based on coding units according to a tree structure, according to some exemplary embodiments.

The video encoding apparatus 800 according to some exemplary embodiments involving video prediction based on coding units according to a tree structure includes a coding unit determiner 820 and an output unit 830. Hereinafter, for convenience of description, the video encoding apparatus 10 according to some exemplary embodiments involving video prediction based on coding units according to a tree structure will be abbreviated to the 'video encoding apparatus 800'.

The coding unit determiner 820 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to some exemplary embodiments may be a data unit having a size of 32×32, 64×64, 128×128, 256×256, etc., wherein a shape of the data unit is a square having a width and length in squares of 2.

A coding unit according to some exemplary embodiments may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to some exemplary embodiments is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 820 encodes at least one split region obtained by splitting a region of the maximum coding unit according to depths, and determines a depth to output a finally encoded image data according to the at least one split region. In other words, the coding unit determiner 820 determines a final depth by encoding the image data in the deeper coding units according to depths, according to the maximum coding unit of the current picture, and selecting a depth having the least encoding error. The determined final depth and the encoded image data according to the determined coded depth are output to the output unit 830.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the final depths may differ according to regions in the image data. Thus, one or more final depths may be determined in one maximum coding unit, and the image data of the maximum coding unit may be divided according to coding units of at least one final depth.

Accordingly, the coding unit determiner 820 according to some exemplary embodiments may determine coding units having a tree structure included in the maximum coding unit. The 'coding units having a tree structure' according to some exemplary embodiments include coding units corresponding to a depth determined to be the final depth, from among all deeper coding units included in the maximum coding unit. A coding unit of a final depth may be hierarchically determined according to depths in the same region of the maximum coding unit, and may be independently determined in different regions. Similarly, a final depth in a current region may be independently determined from a final depth in another region.

A maximum depth according to some exemplary embodiments is an index related to the number of splitting times from a maximum coding unit to a minimum coding unit. A first maximum depth according to some exemplary embodiments may denote the total number of splitting times from the maximum coding unit to the minimum coding unit. A second maximum depth according to some exemplary embodiments may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 800 according to some exemplary embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a final depth according to some exemplary embodiments, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to some exemplary embodiments include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 according to some exemplary embodiments may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to some exemplary embodiments. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to some exemplary embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth, but also about information related to prediction encoding and transformation. Accordingly, the coding unit determiner 820 not only determines a depth having a least encoding error, but also determines a partition mode of splitting a prediction unit into a partition, a prediction mode according to prediction units, and a size of a transformation unit for transformation.

Coding units according to a tree structure in a maximum coding unit and methods of determining a prediction unit/partition, and a transformation unit, according to some exemplary embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs the image data of the maximum coding unit, which is encoded based on the at least one depth determined by the coding unit determiner 820, and split information according to the depth, in bitstreams.

The encoded image data may be obtained by encoding residual data of an image.

The split information according to depth may include information about the depth, about the partition mode in the prediction unit, about the prediction mode, and about split of the transformation unit.

The information about the final depth may be defined by using split information according to depths, which indicates whether encoding is performed on coding units of a lower depth instead of a current depth. If the current depth of the current coding unit is a depth, the current coding unit is encoded, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and split information is determined for a coding unit of a depth, at least one piece of split information may be determined for one maximum coding unit. Also, a depth of the image data of the maximum coding unit may be different according to locations since the image data is hierarchically split according to depths, and thus a depth and split information may be set for the image data.

Accordingly, the output unit 830 according to some exemplary embodiments may assign a corresponding depth and encoding information about an encoding mode to at least one of the coding unit, the prediction unit, and a minimum unit included in the maximum coding unit.

The minimum unit according to some exemplary embodiments is a square data unit obtained by splitting the minimum coding unit constituting the lowermost depth by 4. Alternatively, the minimum unit according to some exemplary embodiments may be a maximum square data unit that may be included in all of the coding units, prediction units, partition units, and transformation units included in the maximum coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference picture index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information related to prediction, prediction information, and slice type information.

In the video encoding apparatus 800 according to the simplest embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 800 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 800 according to some exemplary embodiments, image compression efficiency may be increased since a coding unit is adjusted while considering characteristics of an image while increasing a maximum size of a coding unit while considering a size of the image.

The inter-layer video encoding apparatus described above with reference to FIG. 1A may include as many video encoding apparatuses 800 as the number of layers, in order to encode single-layer images according to layers of a multi-layer video. For example, a first layer encoder may include one video encoding apparatus 100 and a second layer encoder may include as many video encoding apparatuses 800 as the number of second layers.

When the video encoding apparatus 800 encodes first layer images, the coding unit determiner 820 may determine, for each maximum coding unit, a prediction unit for inter-prediction according to coding units having a tree structure, and perform inter-prediction according to prediction units.

Even when the video encoding apparatus 800 encodes second layer images, the coding unit determiner 820 may determine, for each maximum coding unit, coding units and prediction units having a tree structure, and perform inter-prediction according to prediction units.

The video encoding apparatus 800 may encode a luminance difference to compensate for a luminance difference between a first layer image and a second layer image. However, whether to perform luminance may be determined according to an encoding mode of a coding unit. For example, luminance compensation may be performed only on a prediction unit having a size of 2N×2N.

FIG. 9 is a block diagram of the video decoding apparatus 900 based on coding units according to a tree structure, according to some exemplary embodiments of the inventive concept.

The video decoding apparatus 900 according to some exemplary embodiments that involves video prediction based on coding units having a tree structure includes a receiver 910, an image data and encoding information extractor 920, and an image data decoder 930. For convenience of description, the video decoding apparatus 900 according to some exemplary embodiments that involves video prediction based on coding units having a tree structure will be abbreviated to the 'video decoding apparatus 900'.

Definitions of various terms, such as a coding unit, a depth, a prediction unit, a transformation unit, and various split information, for decoding operations of the video decoding apparatus 900 according to some exemplary embodiments are identical to those described with reference to FIG. 8 and the video encoding apparatus 100.

The receiver 910 receives and parses a bitstream of an encoded video. The image data and encoding information extractor 920 extracts encoded image data for each coding unit from the parsed bitstream, wherein the coding units have a tree structure according to each maximum coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information for the coding units having a tree structure according to each maximum coding unit, from the parsed bitstream. The extracted final depth and split information are output to the image data decoder 930. In other words, the image data in a bitstream is split into the maximum coding unit so that the image data decoder 930 decodes the image data for each maximum coding unit.

A depth and split information according to the maximum coding unit may be set for at least one piece of depth information, and split information may include information about a partition mode of a corresponding coding unit, about a prediction mode, and about split of a transformation unit. Also, split information according to depths may be extracted as the information about a depth.

The depth and the split information according to each maximum coding unit extracted by the image data and encoding information extractor 920 is a depth and split information determined to generate a minimum encoding error when an encoder, such as the video encoding apparatus 100 according to some exemplary embodiments, repeatedly performs encoding for each deeper coding unit according to depths according to each maximum coding unit. Accordingly, the video decoding apparatus 900 may reconstruct an image by decoding the image data according to a coded depth and an encoding mode that generates the minimum encoding error.

Since encoding information according to some exemplary embodiments about a depth and an encoding mode may be assigned to a predetermined data unit from among a corresponding coding unit, a prediction unit, and a minimum unit, the image data and encoding information extractor 920 may extract the depth and the split information according to the predetermined data units. If the depth and the split information of a corresponding maximum coding unit is recorded according to predetermined data units, the predetermined data units to which the same depth and the same split information is assigned may be inferred to be the data units included in the same maximum coding unit.

The image data decoder 930 may reconstruct the current picture by decoding the image data in each maximum coding unit based on the depth and the split information according to the maximum coding units. In other words, the image data decoder 930 may decode the encoded image data based on the extracted information about the partition mode, the prediction mode, and the transformation unit for each coding unit from among the coding units having the tree structure included in each maximum coding unit. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be reconstructed.

The image data decoder 930 may determine a depth of a current maximum coding unit by using split information according to depths. If the split information indicates that image data is no longer split in the current depth, the current depth is a depth. Accordingly, the image data decoder 930 may decode encoded data in the current maximum coding unit by using the information about the partition mode of the prediction unit, the prediction mode, and the size of the transformation unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus 20 described above with reference to FIG. 2A may include the number of video decoding apparatuses 900 as much as the number of viewpoints, so as to reconstruct first layer images and second layer images by decoding a received first layer image stream and a received second layer image stream.

When the first layer image stream is received, the image data decoder 930 of the video decoding apparatus 900 may split samples of first layer images extracted from the first layer image stream by the image data and encoding information extractor 920 into coding units having a tree structure. The image data decoder 930 may reconstruct the first layer images by performing motion compensation according to prediction units for inter prediction, on the coding units having the tree structure obtained by splitting the samples of the first layer images.

When the second layer image stream is received, the image data decoder 930 of the video decoding apparatus 900 may split samples of second layer images extracted from the second layer image stream by the image data and encoding information extractor 920 into coding units having a tree structure. The image data decoder 930 may reconstruct the second layer images by performing motion compensation according to prediction units for inter prediction, on the coding units obtained by splitting the samples of the second layer images.

The extractor 920 may obtain information related to a luminance error from a bitstream so as to compensate for a luminance difference between a first layer image and a second layer image. However, whether to perform luminance may be determined according to an encoding mode of a coding unit. For example, luminance compensation may be performed only on a prediction unit having a size of 2N×2N.

Thus, the video decoding apparatus 900 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum split information received from an encoder.

Figure 10:
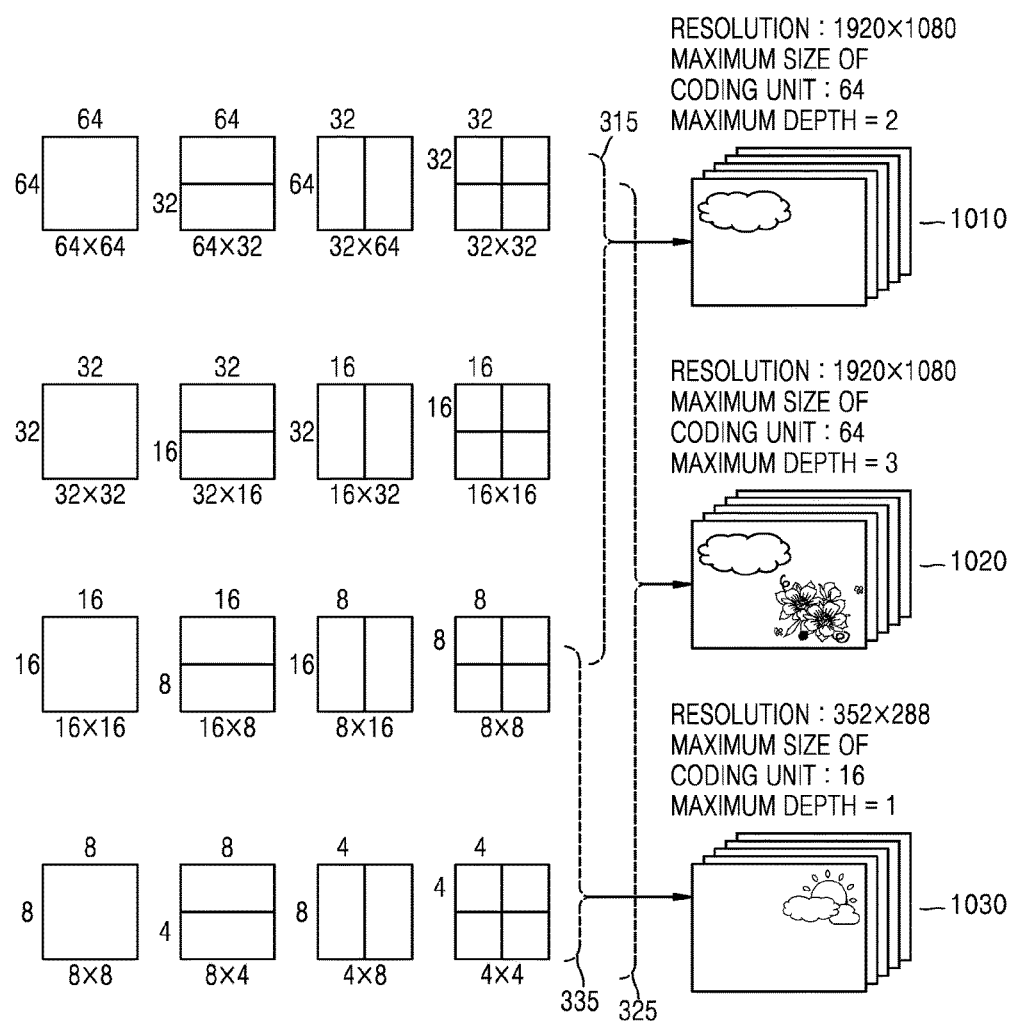
FIG. 10 is a diagram for describing a concept of coding units according to some exemplary embodiments.

FIG. 10 is a diagram for describing a concept of coding units according to some exemplary embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a maximum coding unit having a long axis size of 64, and coding units having long axis sizes of 32 and 16 since depths are deepened to two layers by splitting the maximum coding unit twice. Since the maximum depth of the video data 1030 is 1, coding units 1035 of the video data 1030 may include a maximum coding unit having a long axis size of 16, and coding units having a long axis size of 8 since depths are deepened to one layer by splitting the maximum coding unit once.

Since the maximum depth of the video data 1020 is 3, coding units 1025 of the video data 1020 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
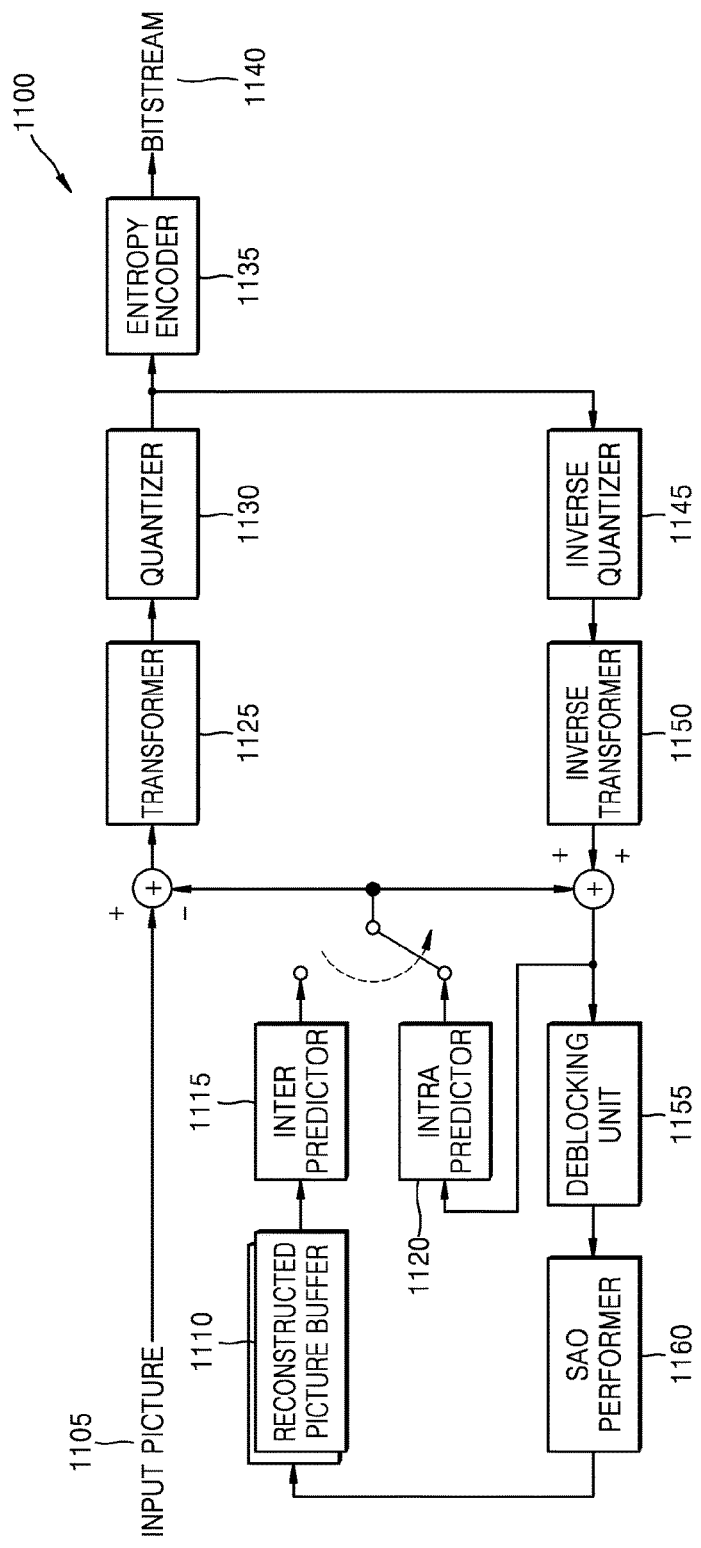
FIG. 11 is a block diagram of an image encoder based on coding units, according to some exemplary embodiments.

FIG. 11 is a block diagram of an image encoder 1100 based on coding units, according to some exemplary embodiments.

The image encoder 1100 according to some embodiments performs operations of the coding unit determiner 1520 of the video encoding apparatus 800 to encode image data. In other words, an intra predictor 1120 performs intra prediction on coding units in an intra mode, from among a current picture 1105, per prediction unit, and an inter predictor 1115 performs inter prediction on coding units in an inter mode by using the current picture 1105 and a reference picture obtained by a restored picture buffer 1110, per prediction unit. The current picture 1105 may be split into maximum coding units, and then the maximum coding units may be sequentially encoded. Here, the encoding may be performed on coding units split in a tree structure from the maximum coding unit.

Residual data is generated by subtracting prediction data of a coding unit of each mode output from the intra predictor 1120 or the inter predictor 1115 from data of the current picture 1105 to be encoded, and the residual data is output as a quantized transformation coefficient through a transformer 1125 and a quantizer 1130 per transformation unit. The quantized transformation coefficient is restored to residual data in a spatial domain through an inverse quantizer 1145 and an inverse transformer 1150. The residual data in the spatial domain is added to the prediction data of the coding unit of each mode output from the intra predictor 1120 or the inter predictor 1115 to be restored as data in a spatial domain of the coding unit of the current picture 1105. The data in the spatial domain passes through a deblocking unit 1155 and a sample adaptive offset (SAO) performer 1160 and thus a restored image is generated. The restored image is stored in the restored picture buffer 1110. Restored images stored in the restored picture buffer 1110 may be used as a reference picture for inter prediction of another image. The quantized transformation coefficient obtained through the transformer 1125 and the quantizer 1130 may be output as a bitstream 1140 through an entropy encoder 1135.

In order for the image encoder 1100 according to some embodiments to be applied in the video encoding apparatus 800, components of the image encoder 1100, i.e., the inter predictor 1115, the intra predictor 1120, the transformer

1125, the quantizer 1130, the entropy encoder 1135, the inverse quantizer 1145, the inverse transformer 1150, the deblocking unit 1155, and the SAO performer 1160 perform operations based on each coding unit among coding units having a tree structure per maximum coding unit.

Specifically, the intra predictor 1120 and the inter predictor 1115 determine partitions and a prediction mode of each coding unit from among the coding units having a tree structure while considering the maximum size and the maximum depth of a current maximum coding unit, and the transformer 1125 may determine whether to split a transformation unit according to a quad-tree in each coding unit from among the coding units having the tree structure.

Figure 12:
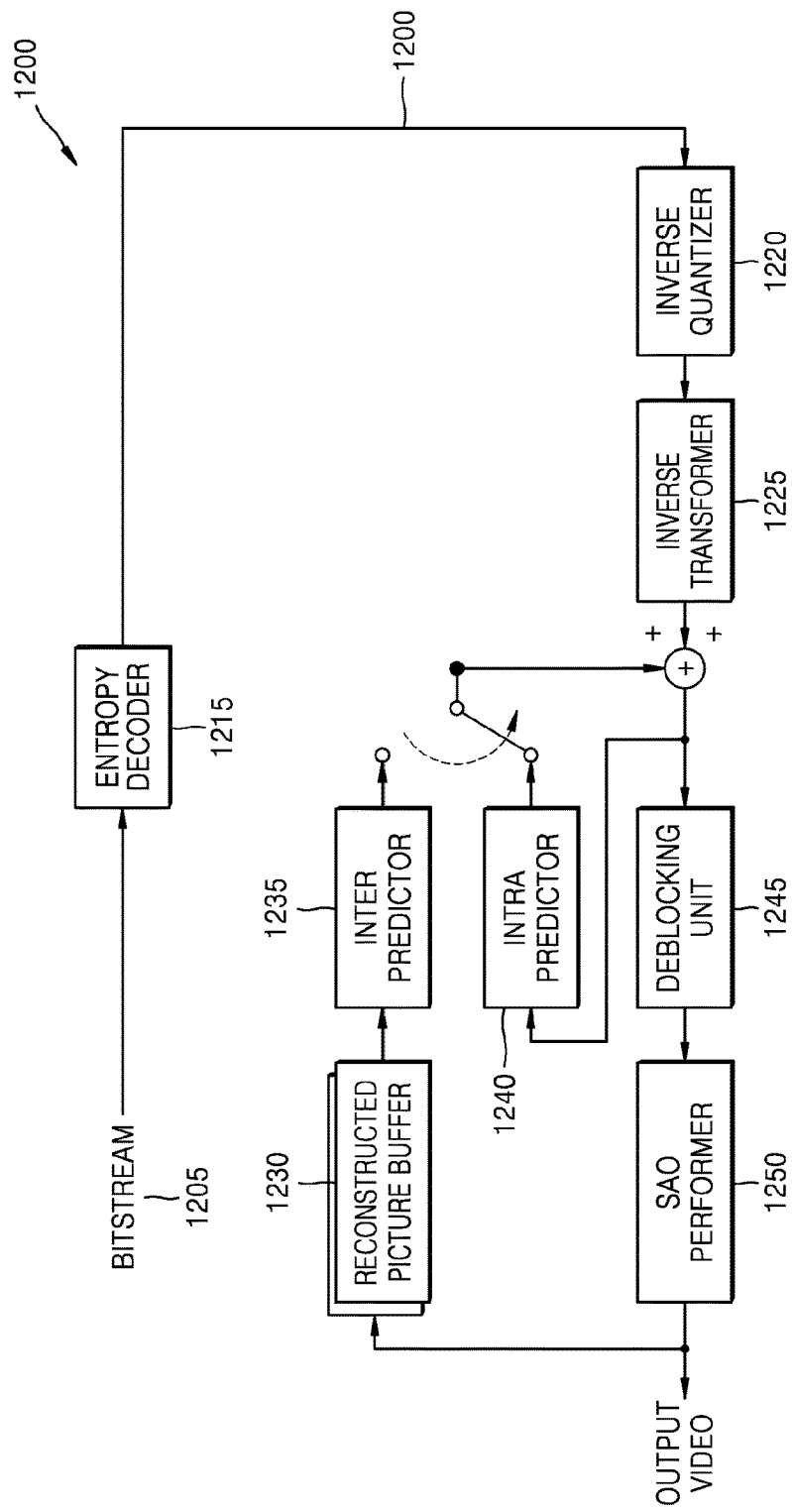
FIG. 12 is a block diagram of an image decoder based on coding units according to some embodiments.

FIG. 12 is a block diagram of an image decoder 1200 based on coding units according to some embodiments.

An entropy decoder 1215 parses encoded image data that is to be decoded and encoding information required for decoding from a bitstream 1205. The encoded image data is a quantized transformation coefficient, and an inverse quantizer 1220 and an inverse transformer 1225 restores residual data from the quantized transformation coefficient.

An intra predictor 1240 performs intra prediction on a coding unit in an intra mode according to prediction units. An inter predictor performs inter prediction on a coding unit in an inter mode from a current picture according to prediction units, by using a reference picture obtained by a restored picture buffer 1230.

Data in a spatial domain of coding units of the current picture is restored by adding the residual data and the prediction data of a coding unit of each mode through the intra predictor and the inter predictor 1235, and the data in the spatial domain may be output as a restored image through a deblocking unit 1245 and an SAO performer 1250. Also, restored images stored in the restored picture buffer 1230 may be output as reference pictures.

In order to decode the image data in the image data decoder 930 of the video decoding apparatus 900, operations after the entropy decoder 1215 of the image decoder 1200 according to some embodiments may be performed.

In order for the image decoder 1200 to be applied in the video decoding apparatus 900 according to some embodiments, components of the image decoder 1200, i.e., the entropy decoder 1215, the inverse quantizer 1220, the inverse transformer 1225, the intra predictor 1240, the inter predictor 1235, the deblocking unit 1245, and the SAO performer 1250 may perform operations based on coding units having a tree structure for each maximum coding unit.

Specifically, the intra prediction 1240 and the inter predictor 1235 determine a partition mode and a prediction mode according to each of coding units having a tree structure, and the inverse transformer 1225 may determine whether to split a transformation unit according to a quad-tree structure per coding unit.

An encoding operation of FIG. 10 and a decoding operation of FIG. 11 are respectively a video stream encoding operation and a video stream decoding operation in a single layer. Accordingly, when the inter-layer video encoding apparatus 10 of FIG. 1A encodes a video stream of at least two layers, the video encoding apparatus 100 of FIG. 1A may include as many image encoders 1100 as the number of layers. Similarly, when the decoder 92 of FIG. 9A decodes a video stream of at least two layers, the video decoding apparatus 900 of FIG. 9A may include as many image decoders 1200 as the number of layers.

Figure 13:
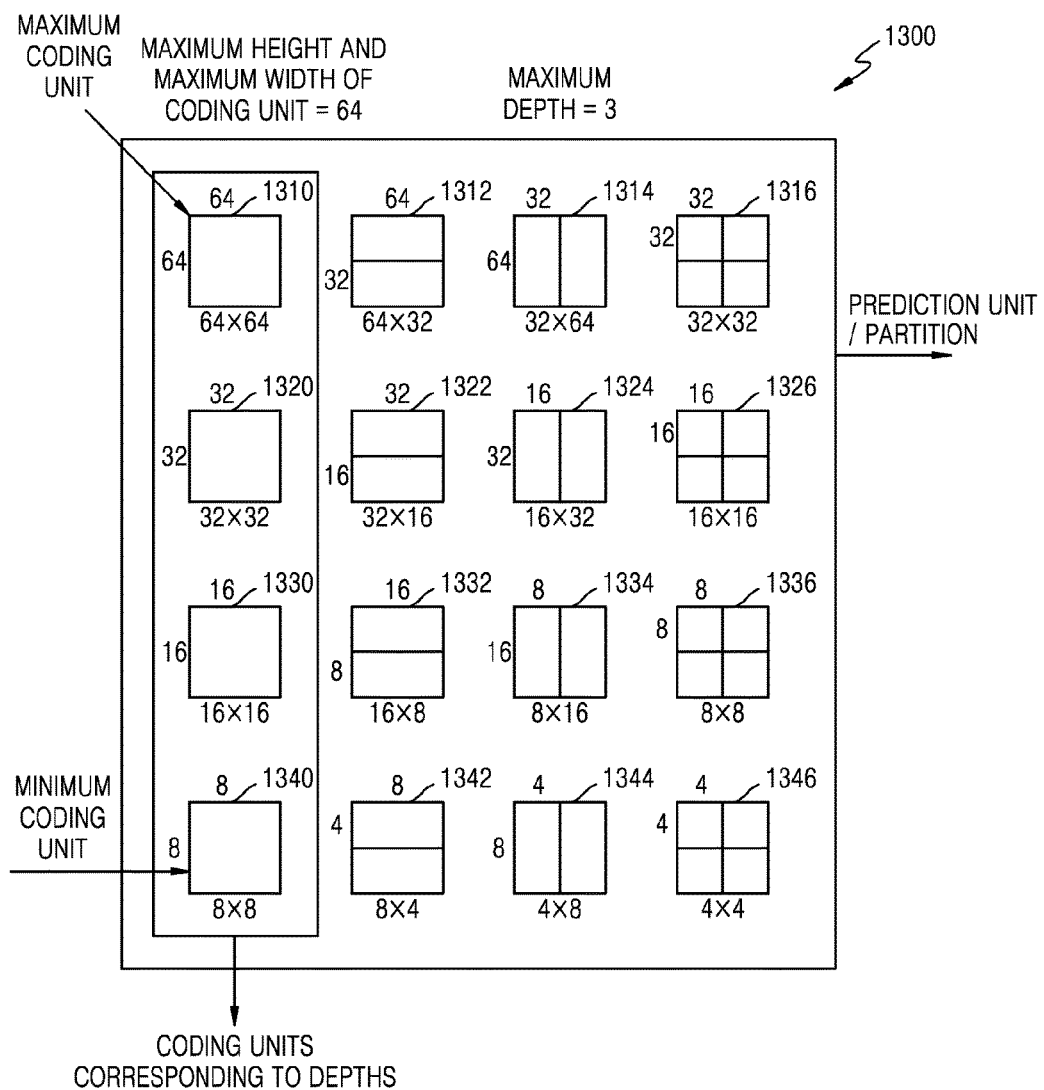
FIG. 13 is a diagram illustrating coding units and partitions, according to some exemplary embodiments of the inventive concept.

FIG. 13 is a diagram illustrating coding units and partitions, according to some exemplary embodiments of the inventive concept.

The video encoding apparatus 800 according to some exemplary embodiments and the video decoding apparatus 900 according to some exemplary embodiments use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 1300 of coding units according to some exemplary embodiments, the maximum height and the maximum width of the coding units are each 134, and the maximum depth is 3. In this case, the maximum depth refers to a total number of times the coding unit is split from the maximum coding unit to the minimum coding unit. Since a depth deepens along a vertical axis of the hierarchical structure 1300 of coding units according to some exemplary embodiments, a height and a width of the deeper coding unit are each split. Also, a prediction unit and partitions, which are bases for prediction encoding of each deeper coding unit, are shown along a horizontal axis of the hierarchical structure 1300.

In other words, a coding unit 1310 is a maximum coding unit in the hierarchical structure 1300, wherein a depth is 0 and a size, i.e., a height by width, is 134×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having a size of 8×8 and a depth of 3 is a minimum coding unit.

The prediction unit and the partitions of a coding unit are arranged along the horizontal axis according to each depth. In other words, if the coding unit 1310 having a size of 134×64 and a depth of 0 is a prediction unit, the prediction unit may be split into partitions include in the encoding unit 1310, i.e. a partition 1310 having a size of 134×64, partitions 1312 having the size of 134×32, partitions 1314 having the size of 32×64, or partitions 1316 having the size of 32×32.

Similarly, a prediction unit of the coding unit 1320 having the size of 32×32 and the depth of 1 may be split into partitions included in the coding unit 1320, i.e. a partition 1320 having a size of 32×32, partitions 1322 having a size of 32×16, partitions 1324 having a size of 16×32, and partitions 1326 having a size of 16×16.

Similarly, a prediction unit of the coding unit 1330 having the size of 16×16 and the depth of 2 may be split into partitions included in the coding unit 1330, i.e. a partition having a size of 16×16 included in the coding unit 1330, partitions 1332 having a size of 16×8, partitions 1334 having a size of 8×16, and partitions 1336 having a size of 8×8.

Similarly, a prediction unit of the coding unit 1340 having the size of 8×8 and the depth of 3 may be split into partitions included in the coding unit 1340, i.e. a partition having a size of 8×8 included in the coding unit 1340, partitions 1342 having a size of 8×4, partitions 1344 having a size of 4×8, and partitions 1346 having a size of 4×4.

In order to determine the depth of the maximum coding unit 1310, the coding unit determiner 120 of the video encoding apparatus 800 according to some exemplary embodiments performs encoding for coding units corresponding to each depth included in the maximum coding unit 1310.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 1300. Alternatively, the minimum encoding error may be searched for by comparing the least encoding errors according to depths, by performing encoding for each depth as the depth deepens along the vertical axis of the hierarchical structure 1300. A depth and a partition having the minimum encoding error in the maximum coding unit 1310 may be selected as the depth and a partition mode of the maximum coding unit 1310.

Figure 14:
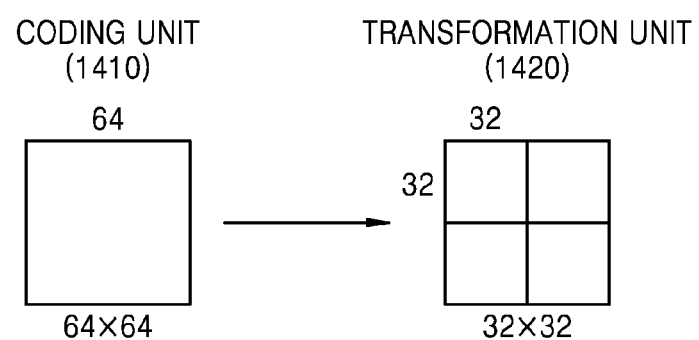
FIG. 14 is a diagram for describing a relationship between a coding unit and transformation units, according to some embodiments of the inventive concept.

FIG. 14 is a diagram for describing a relationship between a coding unit and transformation units, according to some embodiments of the inventive concept.

The video encoding apparatus 800 according to some exemplary embodiments or the video decoding apparatus 900 according to some exemplary embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 800 according to some exemplary embodiments or the video decoding apparatus 900 according to some exemplary embodiments, if a size of a coding unit 1410 is 64×64, transformation may be performed by using a transformation unit 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
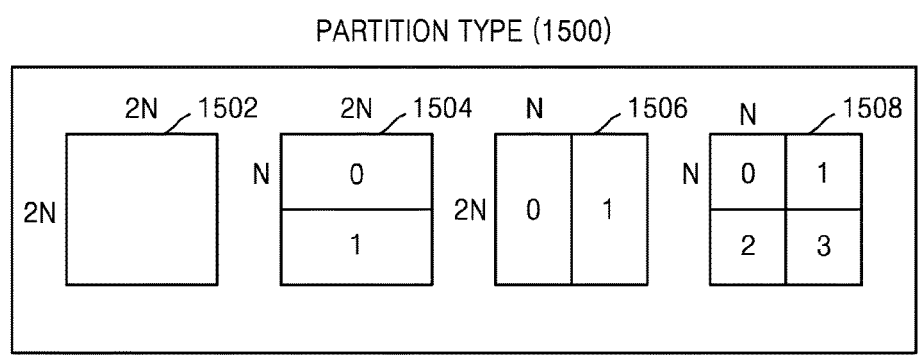
FIG. 15 is a diagram for describing encoding information according to some exemplary embodiments.
Figure 15:
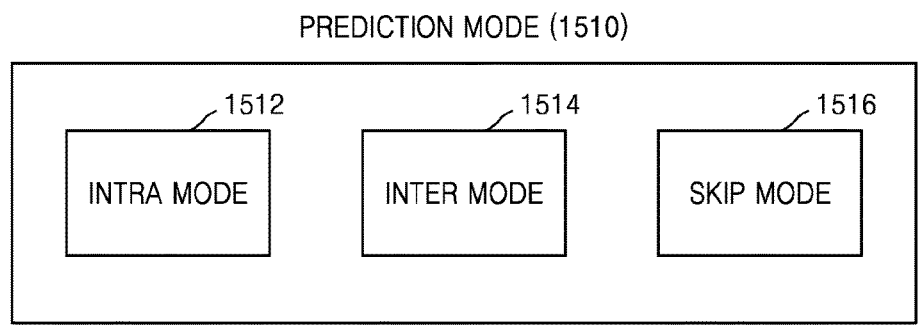
Figure 15:
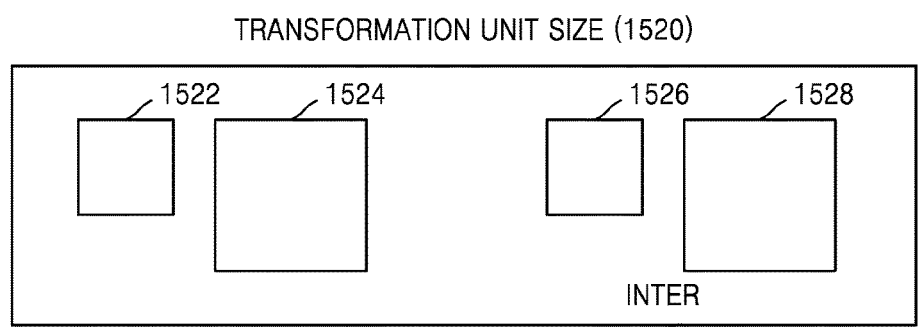

FIG. 15 is a diagram for describing encoding information according to some exemplary embodiments.

The output unit 830 of the video encoding apparatus 800 according to some exemplary embodiments may encode and transmit information 1500 about a partition mode, information 1510 about a prediction mode, and information 1520 about a size of a transformation unit for each coding unit corresponding to a depth, as split information.

The information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the information 1500 about a partition type is set to indicate one of the partition 1504 having a size of 2N×N, the partition 1506 having a size of N×2N, and the partition 1508 having a size of N×N.

The information 1510 indicates a prediction mode of each partition. For example, the information 1510 may indicate a mode of prediction encoding performed on a partition indicated by the information 1500, i.e., an intra mode 1512, an inter mode 1514, or a skip mode 1516.

The information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 according to some exemplary embodiments may extract and use the information 1500, 1510, and 1520 for decoding, according to each deeper coding unit.

Figure 16:
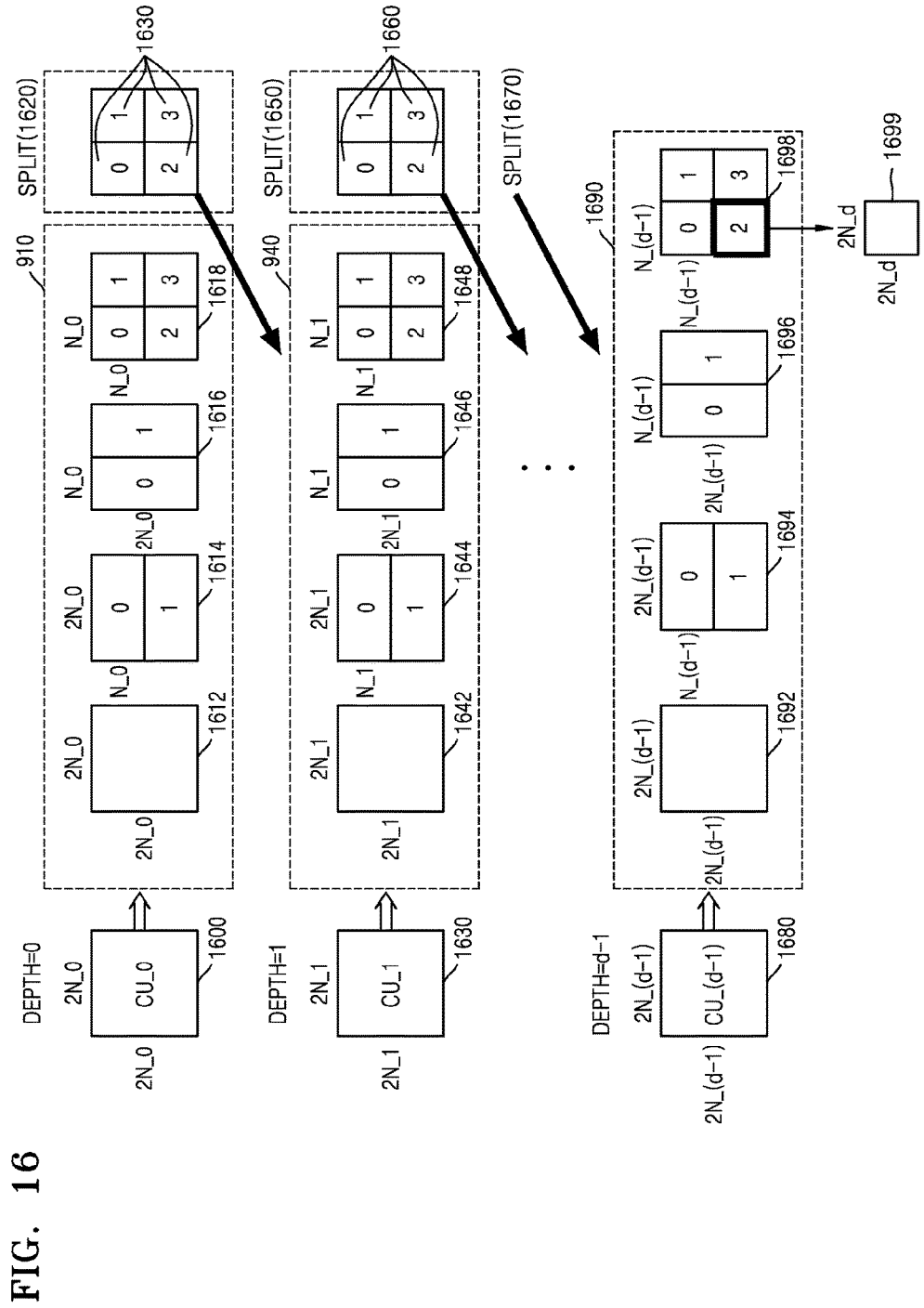
FIG. 16 is a diagram of deeper coding units according to depths, according to some exemplary embodiments.

FIG. 16 is a diagram of deeper coding units according to depths, according to some exemplary embodiments.

Split information may be used to indicate a change of a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partitions 1612 through 1618 which are obtained by symmetrically splitting the prediction unit, but a partition mode is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612 through 1616, the prediction unit 1610 may not be split into a lower depth.

If the encoding error is the smallest in the partition mode 1618, a depth is changed from 0 to 1 to split the partition mode 1618 in operation 1620, and encoding is repeatedly performed on coding units 1630 having a depth of 2 and a size of N_0×N_0 to search for a minimum encoding error.

A prediction unit 1640 for prediction encoding the coding unit 1630 having a depth of 1 and a size of 2N_1×2N_1 (=N_0×N_0) may include partitions of a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648, a depth is changed from 1 to 2 to split the partition mode 1648 in operation 1650, and encoding is repeatedly performed on coding units 1660, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes to search for a partition mode having a minimum encoding error.

Even when the partition mode 1698 has the minimum encoding error, since a maximum depth is d, a coding unit CU_(d−1) having a depth of d−1 is no longer split to a lower depth, and a depth for the coding units constituting a current maximum coding unit 1600 is determined to be d−1 and a partition mode of the current maximum coding unit 1600 may be determined to be N_(d−1)×N_(d−1). Also, since the maximum depth is d, split information for a coding unit 1652 having a depth of d−1 is not set.

A data unit 1699 may be a 'minimum unit' for the current maximum coding unit. A minimum unit according to some exemplary embodiments may be a square data unit obtained by splitting a minimum coding unit having a lowermost depth by 4. By performing the encoding repeatedly, the video encoding apparatus 800 according to some exemplary embodiments may select a depth having the least encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 1 through d, and a depth having the least encoding error may be determined as a d depth. The depth, the partition mode of the prediction unit, and the prediction mode may be encoded and transmitted as split information. Also, since a coding unit is split from a depth of 0 to a depth, only split information of the depth is set to 0, and split information of depths excluding the depth is set to 1.

The image data and encoding information extractor 920 of the video decoding apparatus 900 according to some exemplary embodiments may extract and use the information about the depth and the prediction unit of the coding unit 1600 to decode the partition 1612. The video decoding apparatus 200 according to some exemplary embodiments may determine a depth, in which split information is 0, as a depth by using split information according to depths, and use split information of the corresponding depth for decoding.

Figure 17:
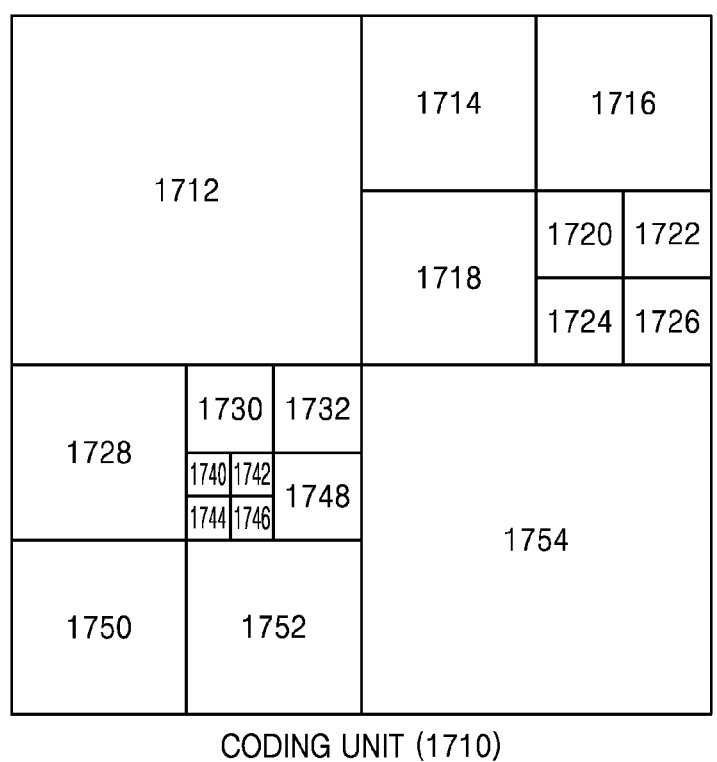
FIGS. 17 through 19 are diagrams for describing a relationship between coding units, prediction units, and transformation units, according to some exemplary embodiments.
Figure 18:
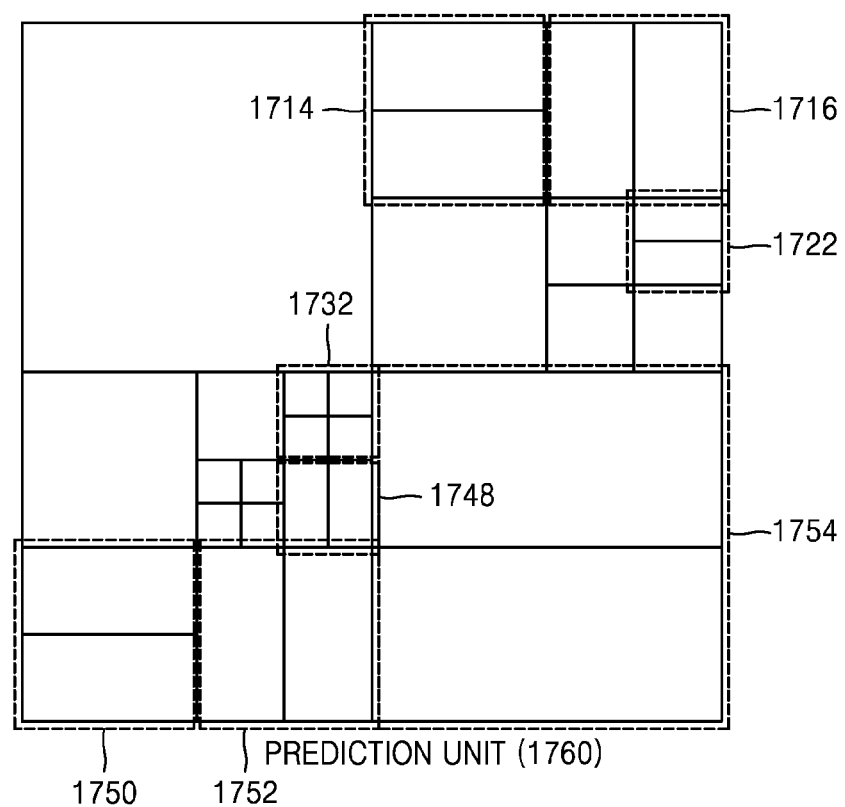
Figure 19:
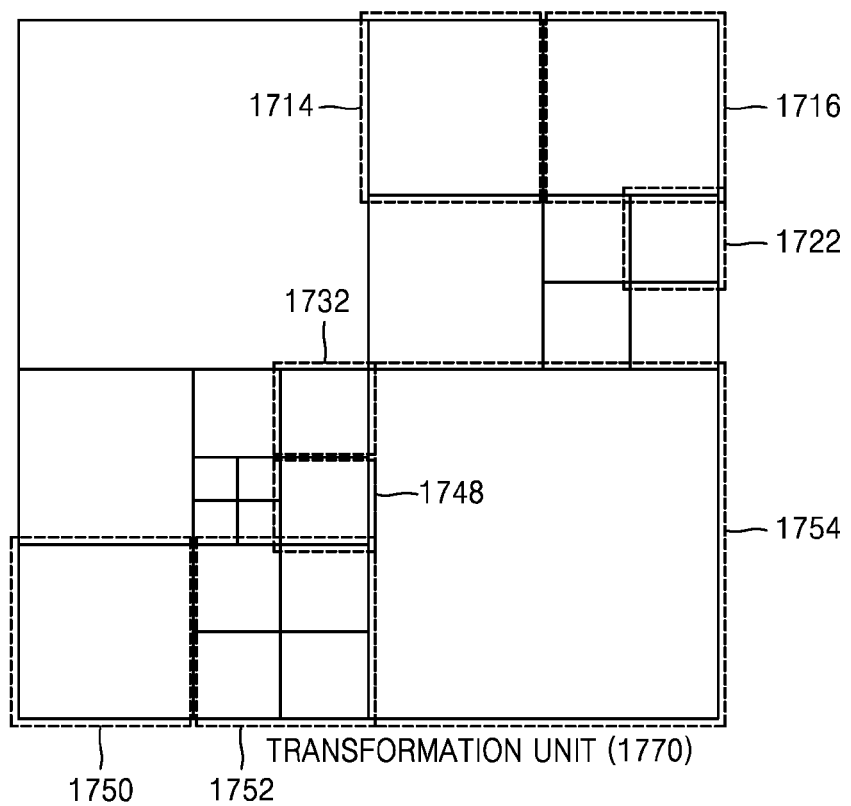

FIGS. 17 through 19 are diagrams for describing a relationship between coding units, prediction units, and transformation units, according to some exemplary embodiments.

Coding units 1710 are coding units having a tree structure, according to depths determined by the video encoding apparatus 800 according to some exemplary embodiments, in a maximum coding unit. Prediction units 1760 are partitions of prediction units of each of coding units according to depths, and transformation units 1770 are transformation units of each of coding units according to depths.

When a depth of a maximum coding unit is 0 in the coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some encoding units 1714, 1716, 1722, 1732, 1748, 1750, 1752, and 1754 are obtained by splitting the coding units in the encoding units 1710. In other words, partition modes in the coding units 1714, 1722, 1750, and 1754 have a size of 2N×N, partition modes in the coding units 1716, 1748, and 1752 have a size of N×2N, and a partition modes of the coding unit 1732 has a size of N×N. Prediction units and partitions of the coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, and 1752 in the transformation units 1770 are different from those in the prediction units 1760 in terms of sizes and shapes. In other words, the video encoding and decoding apparatuses 800 and 900 according to some exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition mode, information about a prediction mode, and information about a size of a transformation unit. Table 9 shows the encoding information that may be set by the video encoding and decoding apparatuses 800 and 900 according to various exemplary embodiments.

TABLE 2

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra | 2N × 2N | 2N × nU | 2N × 2N | N × N (Symmetrical Type) | Repeatedly Encode Coding Units having |
| Inter | 2N × N | 2N × nD | | | |
| Skip (Only | N × 2N | nL × 2N | | | |

TABLE 2-continued

Split Information 0
(Encoding on Coding Unit having Size of 2N × 2N and Current Depth of d)

| Prediction Mode | Partition Type | | Size of Transformation Unit | | Split Information 1 |
| --- | --- | --- | --- | --- | --- |
| | Symmetrical Partition Type | Asymmetrical Partition Type | Split Information 0 of Transformation Unit | Split Information 1 of Transformation Unit | |
| 2N × 2N) | N × N | nR × 2N | | N/2 × N/2 (Asymmetrical Type) | Lower Depth of d + 1 |

The output unit 830 of the video encoding apparatus 800 according to some exemplary embodiments may output the encoding information about the coding units having a tree structure, and the image data and encoding information extractor 920 of the video decoding apparatus 900 according to some exemplary embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition type of the current coding unit is an asymmetrical partition mode, the size of the transformation unit may be N/2×N/2.

The encoding information about coding units having a tree structure, according to some exemplary embodiments, may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
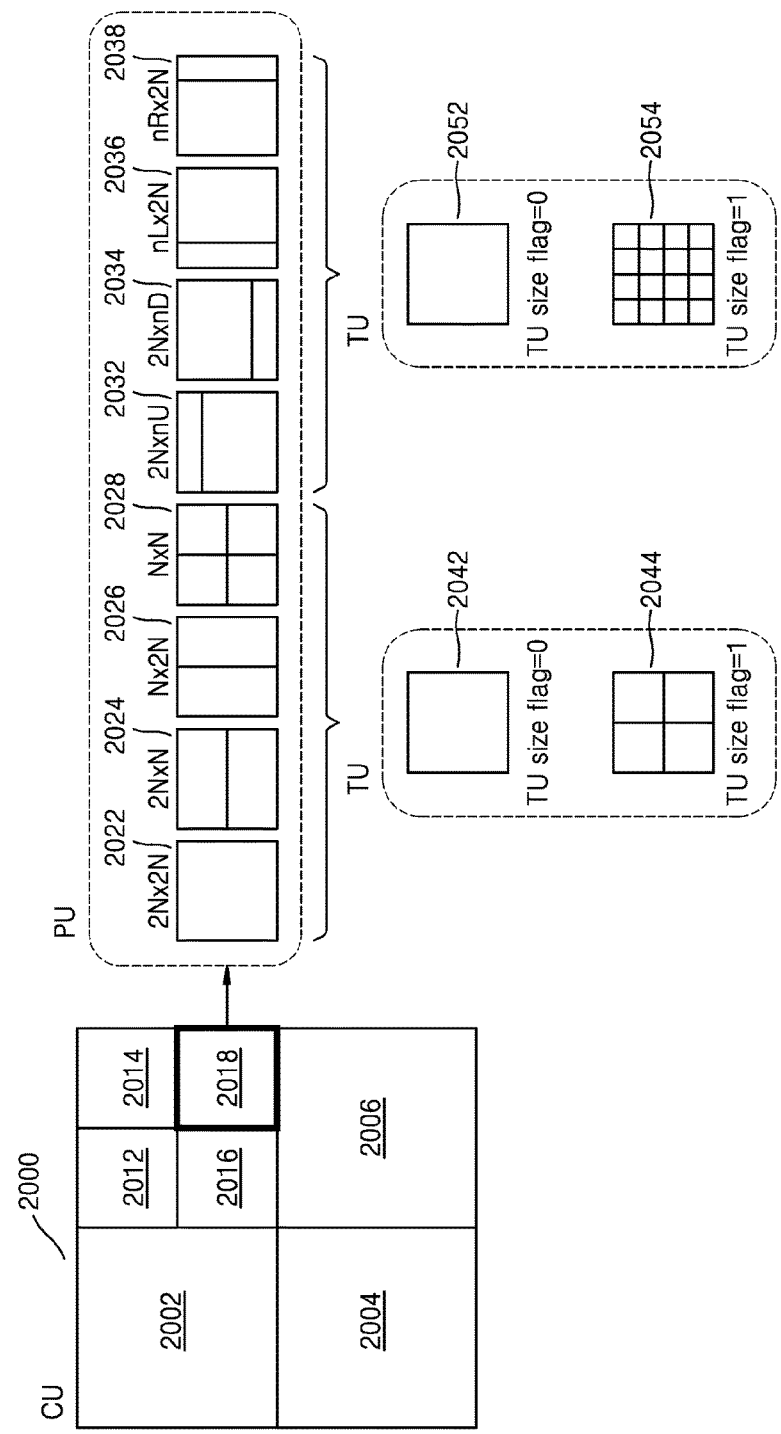
FIG. 20 is a diagram for describing a relationship between a coding unit, a prediction unit, and a transformation unit, according to encoding mode information of FIG. 7C.

FIG. 20 is a diagram for describing a relationship between a coding unit, a prediction unit, and a transformation unit, according to encoding mode information of Table 1.

A maximum coding unit 2000 includes coding units 2002, 2004, 2006, 2012, 2014, 2016, and 2018 of depths. Here, since the coding unit 2018 is a coding unit of a depth, split information may be set to 0. Information about a partition mode of the coding unit 2018 having a size of 2N×2N may be set to be one of a partition mode 2022 having a size of 2N×2N, a partition mode 2024 having a size of 2N×N, a partition mode 2026 having a size of N×2N, a partition mode 2028 having a size of N×N, a partition mode 2032 having a size of 2N×nU, a partition mode 2034 having a size of 2N×nD, a partition mode 2036 having a size of nL×2N, and a partition mode 2038 having a size of nR×2N.

Split information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 2022, 2024, 2026, or 2028, a transformation unit 2042 having a size of 2N×2N is set if a TU size flag of a transformation unit is 0, and a transformation unit 2044 having a size of N×N is set if a TU size flag is 1.

When the partition mode is set to be asymmetrical, i.e., the partition mode 2032, 2034, 2036, or 2038, a transformation unit 2052 having a size of 2N×2N is set if a TU size flag is 0, and a transformation unit 2054 having a size of N/2×N/2 is set if a TU size flag is 1.

Referring to FIG. 19, the TU size flag is a flag having a value or 0 or 1, but the TU size flag according to some exemplar embodiments is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to some exemplary embodiments, together with a maximum size and minimum size of the transformation unit. The video encoding apparatus 800 according to some exemplary embodiments is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 900 according to some exemplary embodiments may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{\wedge}MaxTransformSizeIndex)) \quad (1)$$

Compared to the current minimum transformation unit size 'CurrMinTuSize' that can be determined in the current coding unit, a transformation unit size RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size RootTuSize', when the TU size flag is 0, is split a number of times corresponding to the maximum TU size flag, and 'MinTransformSize' denotes a minimum transformation size. Thus, a smaller value from among RootTuSize/(2^MaxTransformSizeIndex)' and 'MinTransformSize' may be the current minimum transformation unit size 'CurrMinTuSize' that can be determined in the current coding unit.

According to some exemplary embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size RootTuSize' that varies according to the type of a prediction mode in a partition unit is just an example and the inventive concept is not limited thereto.

According to the video encoding method based on coding units having a tree structure as described with reference to FIGS. 8 through 20, image data of a spatial region is encoded for each coding unit of a tree structure. According to the video decoding method based on coding units having a tree structure, decoding is performed for each maximum coding unit to reconstruct image data of a spatial region. Thus, a picture and a video that is a picture sequence may be reconstructed. The reconstructed video may be reproduced by a reproducing apparatus, stored in a storage medium, or transmitted through a network.

The embodiments according to the inventive concept may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method and/or the video encoding method described above with reference to FIGS. 1A through 20 will be collectively referred to as a 'video encoding method of the inventive concept'. In addition, the video decoding method and/or the video decoding method described above with reference to FIGS. 1A through 20 will be referred to as a 'video decoding method of the inventive concept'.

Also, a video encoding apparatus including the video encoding apparatus, the video encoding apparatus 800, or the image encoder 1100, which has been described with reference to FIGS. 1A through 20, will be referred to as a 'video encoding apparatus of the inventive concept'. In addition, a video decoding apparatus including the inter-layer video decoding apparatus, the video decoding apparatus 900, or the image decoder 1200, which has been descried with reference to FIGS. 1A through 20, will be referred to as a 'video decoding apparatus of the inventive concept'.

A computer-readable recording medium storing a program, e.g., a disc 26000, according to some exemplary embodiments will now be described in detail.

Figure 21:
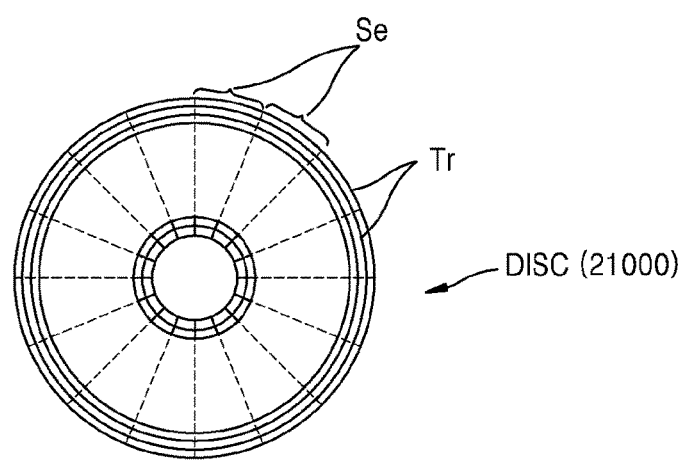
FIG. 21 is a diagram of a physical structure of a disc in which a program is stored, according to some exemplary embodiments.

FIG. 21 is a diagram of a physical structure of the disc 26000 in which a program is stored, according to some exemplary embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to the some exemplary embodiments, a program that executes the quantization parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
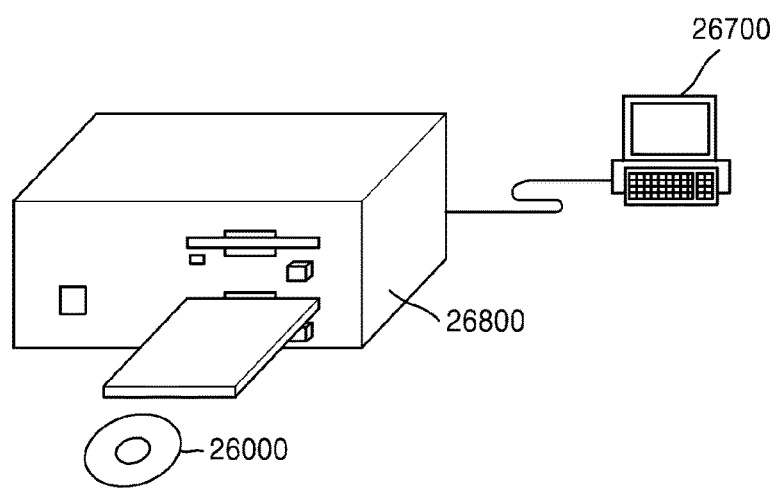
FIG. 22 is a diagram of a disc drive for recording and reading a program to and from a disc.

FIG. 22 is a diagram of a disc drive 26800 for recording and reading a program by using the disc 26000. A computer system 27000 may store a program that executes at least one of a video encoding method and a video decoding method of the inventive concept, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method of the inventive concept may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
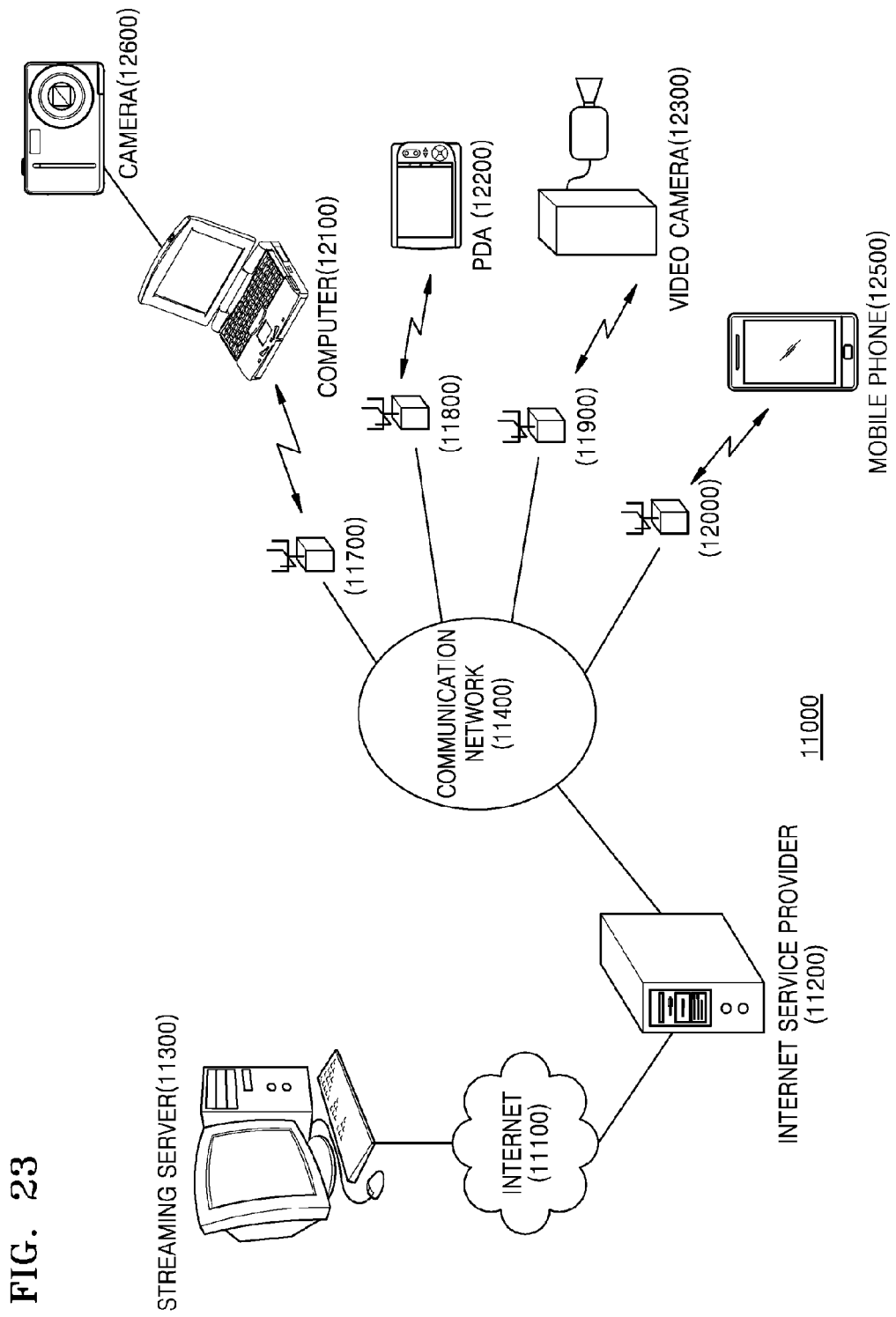
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
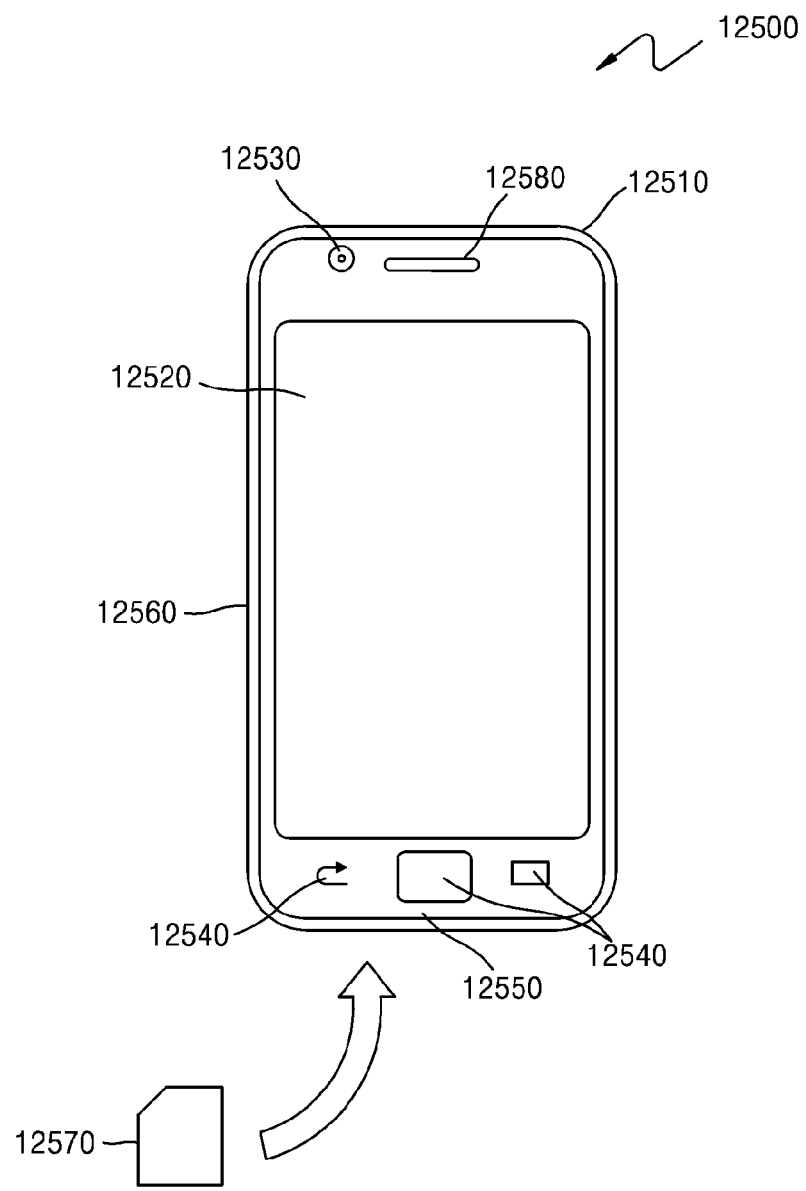
FIGS. 24 and 25 illustrate an external structure and an internal structure of a mobile phone to which a video encoding method and a video decoding method of the inventive concept are applied, according to some exemplary embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 according to some exemplary embodiments may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus of the inventive concept.

The mobile phone 12500 included in the content supply system 11000 according to an embodiment will now be described in greater detail with referring to FIGS. 24 and 25.

FIG. 24 illustrates an external structure of the mobile phone 12500 to which a video encoding method and a video decoding method of the inventive concept are applied, according to some exemplary embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
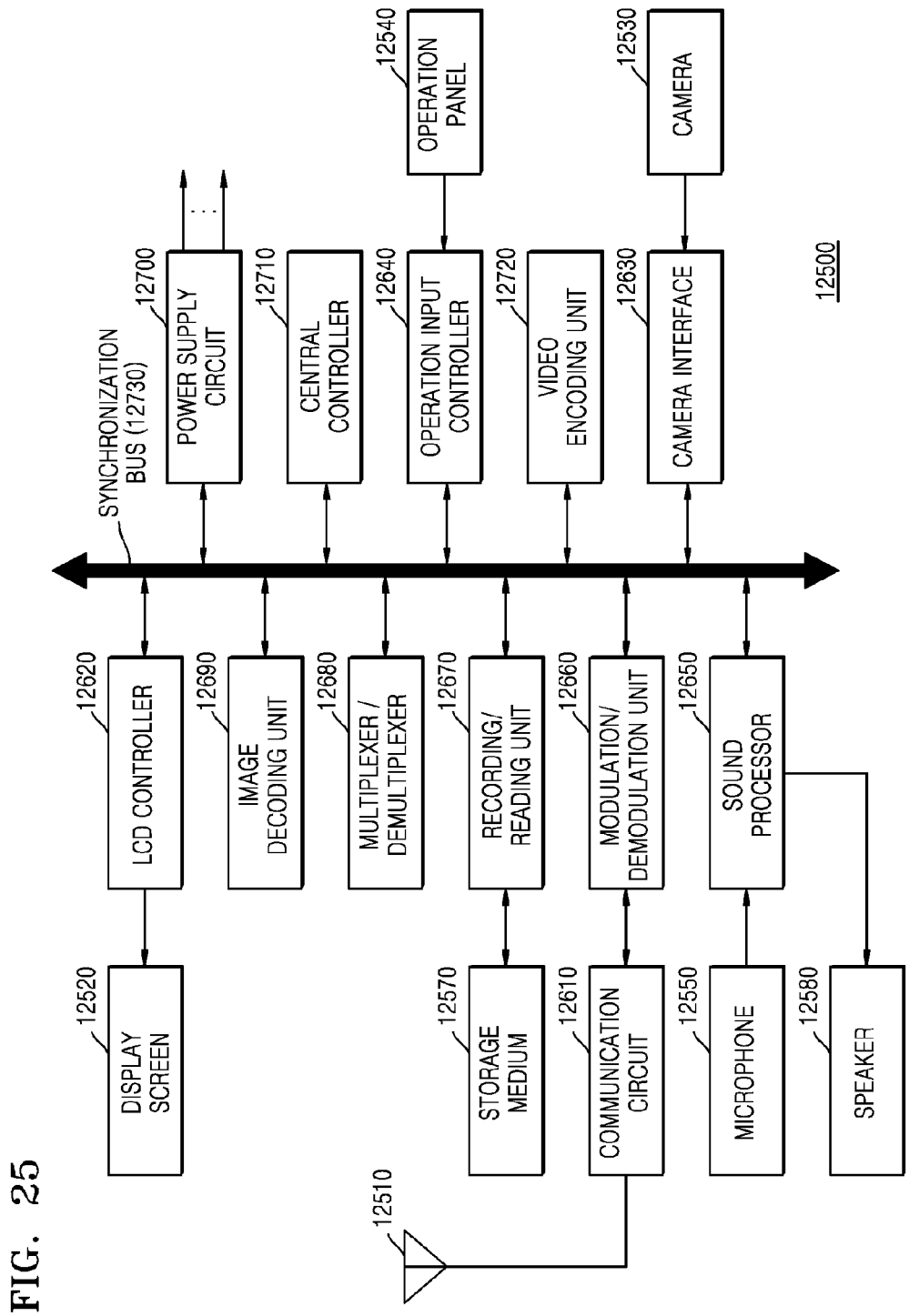

FIG. 25 illustrates an internal structure of the mobile phone 12500. To systemically control parts of the mobile phone 12500 including the display screen 12520 and the operation panel 12540, a power supply circuit 12700, an operation input controller 12640, a video encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the video encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data in the data communication mode, image data captured by the camera 12530 is provided to the video encoding unit 12720 via the camera interface 12630. The captured image data may be directly displayed on the display screen 12520 via the camera interface 12630 and the LCD controller 12620.

A structure of the video encoding unit 12720 may correspond to that of the video encoding apparatus 100 described above. The video encoding unit 12720 may transform the image data received from the camera 12530 into compressed and encoded image data according to the video encoding method described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the video encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the inventive concept, may be a transceiving terminal including only the video encoding apparatus, or may be a transceiving terminal including only the video decoding apparatus.

Figure 26:
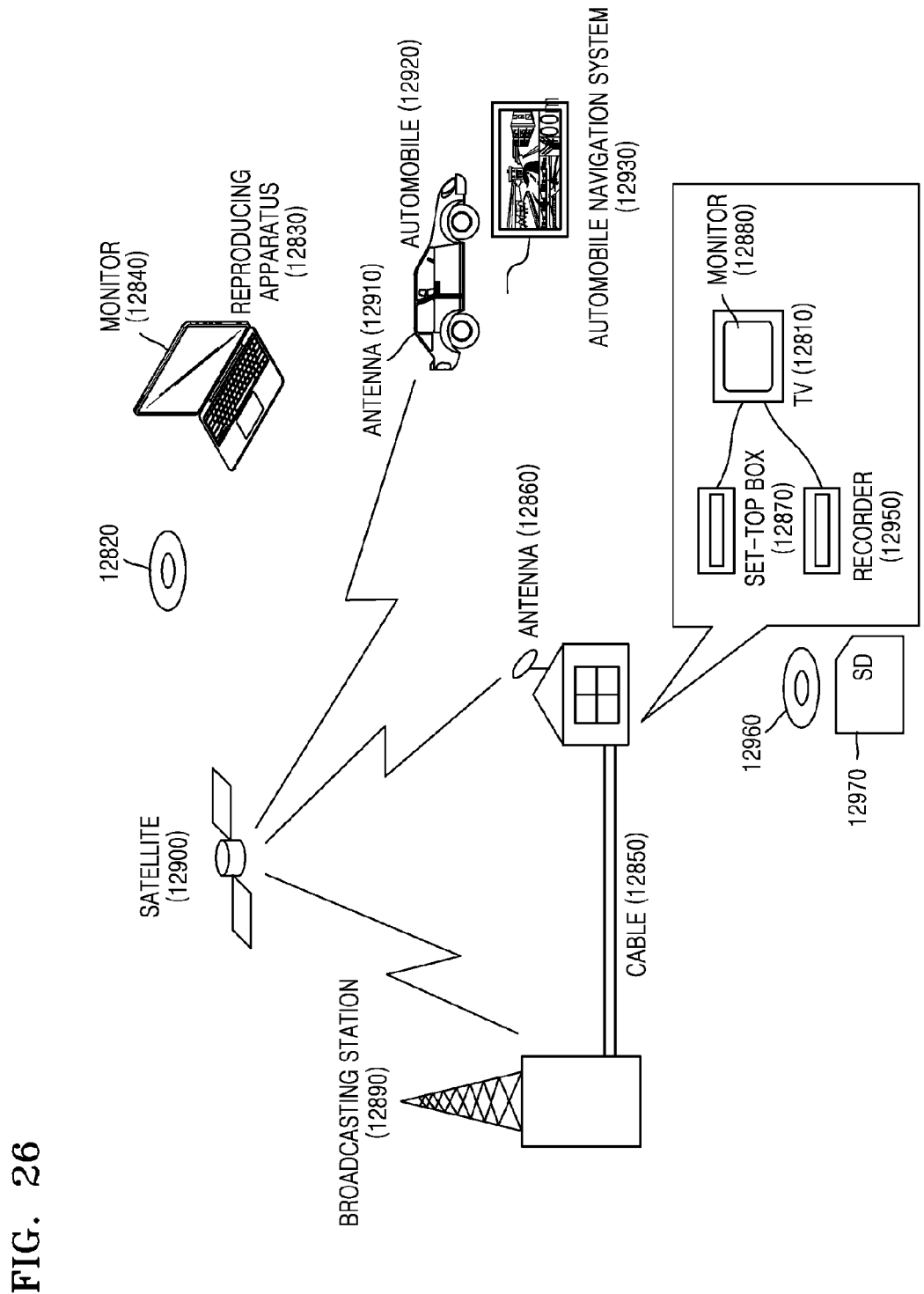
FIG. 26 illustrates a digital broadcasting system employing a communication system, according to some exemplary embodiments.

A communication system according to the inventive concept is not limited to the communication system described above with reference to FIG. 24. For example, FIG. 26 illustrates a digital broadcasting system employing a communication system, according to some exemplary embodiments. The digital broadcasting system of FIG. 26 according to some exemplary embodiments may receive a digital broadcast transmitted via a satellite or a terrestrial network by using a video encoding apparatus and a video decoding apparatus of the inventive concept.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus of the inventive concept is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the inventive concept may be installed. Data output from the set-top box 12870 may also be reproduced on a TV monitor 12880.

As another example, a video decoding apparatus of the inventive concept may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the inventive concept and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the inventive concept according to some exemplary embodiments, a video signal recorded on the DVD disc 12960, the SD card 12970, or another storage medium may be reproduced on the TV monitor 12880.

The automobile navigation system 12930 may not include the camera 12530, the camera interface 12630, and the video encoding unit 12720 of FIG. 26. For example, the computer 12100 and the TV receiver 12810 may not be included in the camera 12530, the camera interface 12630, and the video encoding unit 12720 of FIG. 26.

Figure 27:
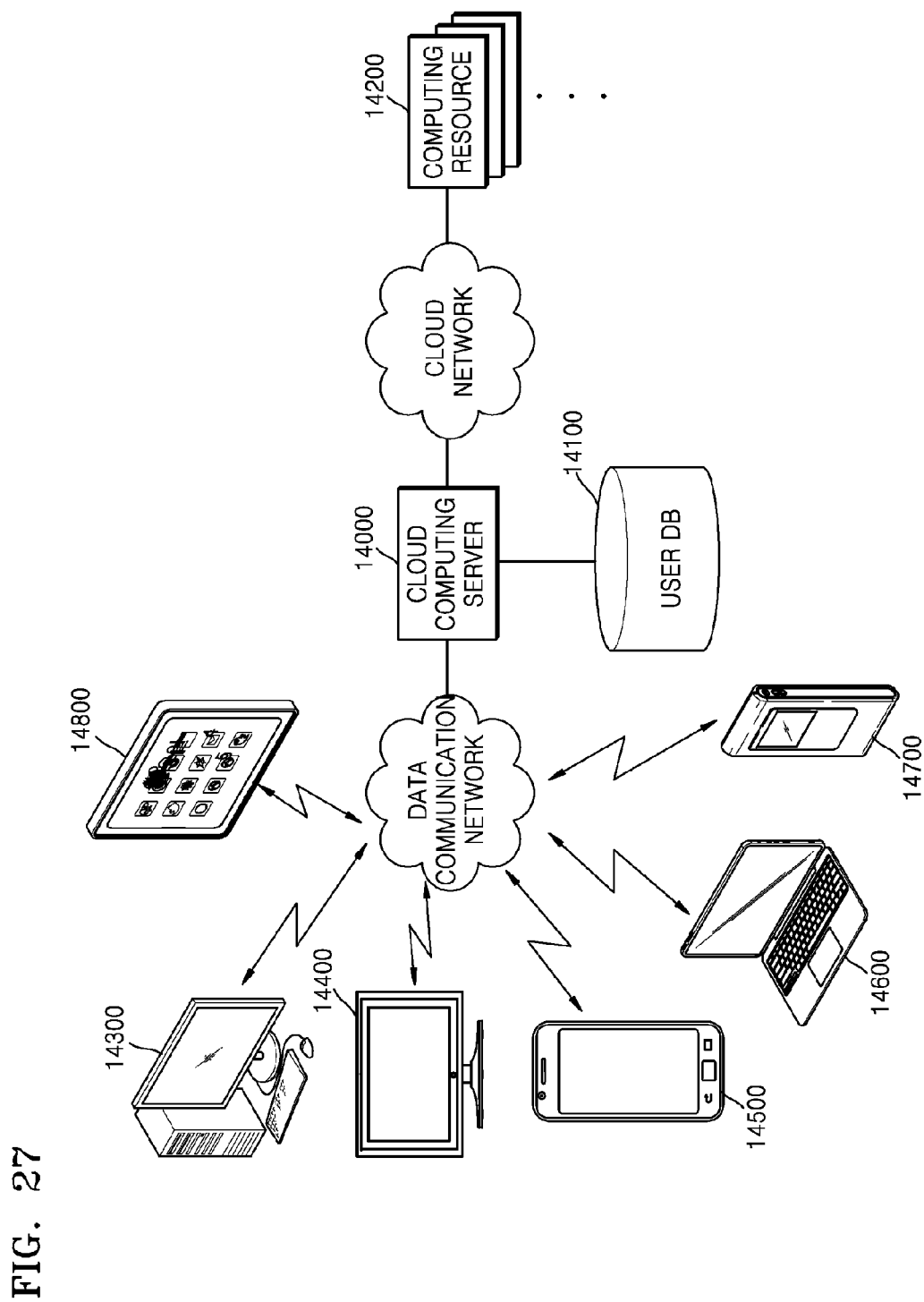
FIG. 27 is a diagram illustrating a network structure of a cloud computing system using a video encoding apparatus and a video decoding apparatus, according to some exemplary embodiments.

FIG. 27 is a diagram illustrating a network structure of a cloud computing system using a video encoding apparatus and a video decoding apparatus, according to some exemplary embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the inventive concept as described above with reference to FIGS. 1A to 20. As another example, the user terminal may include a video encoding apparatus of the inventive concept as described above with reference to FIGS. 1A to 20. Alternatively, the user terminal may include both the video decoding apparatus and the video encoding apparatus of the inventive concept as described above with reference to FIGS. 1A to 20.

Various applications of a video encoding method, a video decoding method, a video encoding apparatus, and a video decoding apparatus according to some exemplary embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device, according to some exemplary embodiments, are not limited to the embodiments described above with reference to FIGS. 21 to 27.

It will be understood by those of ordinary skill in the art that various changes in form and details may be made therein without departing from the spirit and scope of the inventive concept as defined by the appended claims. The embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

The invention claimed is:

1. An inter-layer video decoding method comprising:
   obtaining prediction mode information regarding a current block of a depth image from a bitstream;
   when a prediction mode is a Depth Modeling Mode according to the prediction mode information, generating a reference value for the current block from a reference block of a texture image corresponding to the depth image;
   dividing the current block into a first area including a left-top pixel and a second area including a right-bottom pixel based on the reference value;
   determining a prediction value for the first area and a prediction value for the second area based on neighboring pixels of the current block; and
   decoding the depth image by using the prediction value for the first area and the prediction value for the second area,
   wherein the neighboring pixels for determining the prediction value for the first area and the prediction value for the second area are determined according to whether a left-bottom pixel is included in the first area or the second area and whether a right-top pixel is included in the first area or the second area,
   wherein when both of the left-bottom pixel and the right-top pixel are included in the first area and the second area, the prediction value for the first area is determined based on neighboring pixels near the left-top pixel.

2. The inter-layer video decoding method of claim 1, wherein when the left-bottom pixel is included in the first area and the right-top pixel is included in the second area, the prediction value for the first area is determined based on a neighboring pixel near the middle of a left side of the current block, and the prediction value for the second area is determined based on a neighboring pixel near the right-top pixel of the current block.

3. The inter-layer video decoding method of claim 1, wherein when the left-bottom pixel is included in the second area and the right-top pixel is included in the first area, the prediction value for the first area is determined based on a neighboring pixel near the middle of an upper side of the current block, and the prediction value for the second area is determined based on a neighboring pixel near the left-bottom pixel of the current block.

4. An inter-layer video decoding apparatus comprising:
   a prediction mode determiner configured to obtain prediction mode information regarding a current block of a depth image from a bitstream;
   a prediction block generator configured to generate a reference value for the current block from a reference block of a texture image corresponding to the depth image when a prediction mode is a Depth Modeling Mode according to the prediction mode information;
   a prediction value calculator configured to divide the current block into a first area including a left-top pixel and a second area including a right-bottom pixel based on the reference value and determine a prediction value for the first area and a prediction value for the second area based on neighboring pixels of the current block; and
   a decoder configured to decode the depth image by using the prediction value for the first area and the prediction value for the second area,
   wherein the neighboring pixels for determining the prediction value for the first area and the prediction value for the second area are determined according to whether a left-bottom pixel is included in the first area or the second area and whether a right-top pixel is included in the first area or the second area,
   wherein when both of the left-bottom pixel and the right-top pixel are included in the first area and the second area, the prediction value for the first area is determined based on neighboring pixels near the left-top pixel.

5. The inter-layer video decoding apparatus of claim 4, wherein when the left-bottom pixel is included in the first area and the right-top pixel is included in the second area, an average value for the first area is determined based on a neighboring pixel near the middle of a left side of the current block, and an average value for the second area is determined based on a neighboring pixel near the right-top pixel of the current block.

6. The inter-layer video decoding apparatus of claim 4, wherein when the left-bottom pixel is included in the second area and the right-top pixel is included in the first area, an average value for the first area is determined based on a neighboring pixel near the middle of an upper side of the current block, and an average value for the second area is determined based on a neighboring pixel near the left-bottom pixel of the current block.

7. A non-transitory computer readable recording medium having recorded thereon a computer program for implementing the inter-layer video decoding method of claim 1.

* * * * *